United States Patent [19]

Kato et al.

[11] Patent Number: 4,672,477
[45] Date of Patent: Jun. 9, 1987

[54] CASSETTE TAPE DECK

[75] Inventors: Itsuo Kato; Tetsuro Kamimura; Kaoru Takemasa; Junichi Onishi, all of Saitama, Japan

[73] Assignee: Pioneer Electronic Corporation, Tokyo, Japan

[21] Appl. No.: 781,576

[22] Filed: Sep. 30, 1985

[30] Foreign Application Priority Data

Sep. 28, 1984 [JP] Japan .................................. 59-203875

[51] Int. Cl.[4] .............................................. G11B 5/54
[52] U.S. Cl. ..................................... 360/96.2; 360/105
[58] Field of Search ............................... 360/105, 96.2

[56] References Cited

U.S. PATENT DOCUMENTS 4,399,475  8/1983  Shimomoe ........................ 360/105
4,442,467  4/1984  Ikedo ................................ 360/105

Primary Examiner—A. Michael Chambers
Attorney, Agent, or Firm—Sughrue, Mion, Zinn, Macpeak and Seas

[57] ABSTRACT

A cassette deck which can be easily miniaturized while being capable of being manufactured at a reduced cost. The cassette deck includes a head stand reciprocably mounted to be able to move in a direction perpendicular to the tape running direction. A magnetic head is mounted on the head stand and is rotatable between two positions about an axis parallel to the direction of movement of the head stand. A tape-running-direction switching unit selects the tape running direction according to the angular position of the head. A head stand driving mechanism is provided including a first gear rotated to reciprocate the head stand. A head rotating mechanism includes a second gear which when rotated rotates the magnetic head. Torque is applied to the first and second gears from a single drive source.

6 Claims, 26 Drawing Figures

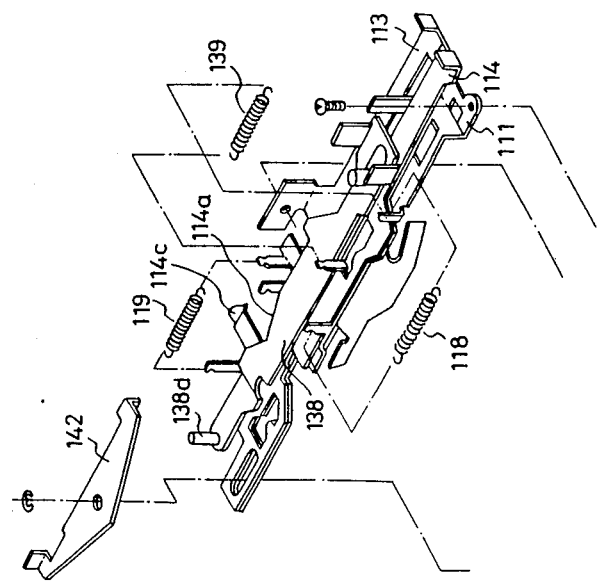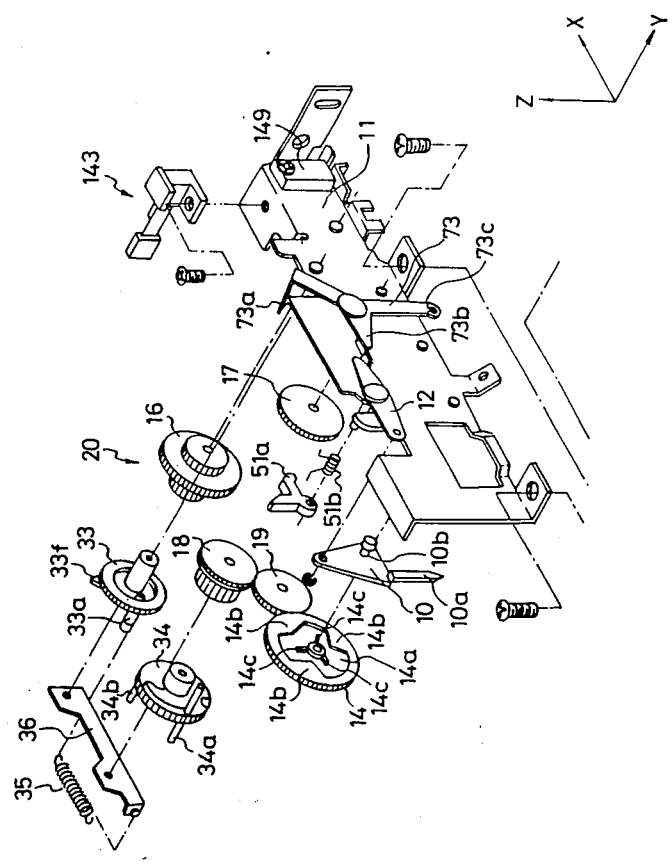
FIG. 7

CASSETTE TAPE DECK

BACKGROUND OF THE INVENTION

The present invention relates to cassette tape decks.

A recent tendency in cassette tape decks is to reduce their size. This tendency is remarkable especially for a mobile cassette tape deck because, in an automobile, the space for the cassette tape deck is limited.

In the sound reproduction of a four-track magnetic tape, for instance, on which sound has been recorded by running the magnetic tape both in the forward direction and in the reverse direction, a method is generally employed in which, after sound reproduction by running the magnetic tape in one direction is accomplished, the cassette is turned over and inserted into the cassette tape deck again. However, the method is rather troublesome. In order to eliminate the difficulty, a cassette tape deck incorporating an automatic reversing mechanism has been employed. As is well known, an automatic reversing mechanism automatically runs the magnetic tape in the opposite direction and sets the magnetic head in place appropriately according to the tracks in the forward and reverse directions.

A variety of mechanisms for switching a magnetic head according to the tape running direction (forward and reverse direction) have been proposed. For instance, for sound reproduction of a four-track magnetic tape, a system is known in which a four-channel magnetic head is provided, and two two-channel groups are electrically switched over to each other (selected for output) according to the tape forward and reverse running direction. In addition, a system is employed in which a two-channel magnetic head is used, and the magnetic head body is moved in a parallel direction or rotated depending on whether the tape is run in the forward direction or in the reverse direction. Of these magnetic head switching system, the magnetic head rotating system has been preferred because azimuth adjustment can be independently applied in the running of the magnetic tape both in the forward direction and in the reverse direction, and the system is excellent in reproduction frequency characteristics compared with other systems.

In the magnetic head rotating system, the magnetic head is moved in a direction perpendicular to the tape running direction, whereby the magnetic head is disengaged from the magnetic tape and is turned. Thereafter, the magnetic head is moved back so as to abut against the magnetic tape.

A conventional cassette tape deck has a drive source for rotating the magnetic head, and another drive source for reciprocating the head stand in a direction perpendicular to the tape running direction. That is, the conventional cassette tape deck has at least two drive sources. This fact is a hindrance to further miniaturization of the cassette tape deck and reduction of the manufacturing cost.

SUMMARY OF THE INVENTION

In view of the foregoing, an object of the invention is to provide a cassette tape deck which can be miniaturized with ease and is low in manufacturing cost.

Provided according to the invention is a cassette tape deck which comprises: a head stand which can freely reciprocate in a direction substantially perpendicular to a tape running direction; a magnetic head provided on said head stand and constructed in such a manner that the magnetic head is swingable between two angular positions and about an axis which is substantially parallel to the diretion of movement of the head stand; tape-running-direction switching means for selecting a tape running direction separately according to the two angular positions of the magnetic head; a head stand driving mechanism including a first gear which is rotated to reciprocate the head stand; and a head rotating mechanism including a second gear which is rotated to rotate the magnetic head, torque being applied to the first and second gears by torque dividing means including a single drive source.

Further, provided according to the invention is a cassette tape deck which comprises: a head stand which can reciprocate in a direction substantially perpendicular to a tape running direction; a magnetic head mounted on the head stand in such a manner that the magnetic head is rotatable between two angular positions and about an axis substantially parallel to the direction of movement of the head stand; tape-running-direction switching means for selecting a tape running direction separately according to the two angular positions of the magnetic head; a head stand driving mechanism including a first gear rotated to reciprocate the head stand; a head rotating mechanism including a gear transmission mechanism, engageable with the first and second gears, for applying torque from a single drive to the first and second gears; and trigger means for causing, after the first gear is engaged with the gear transmission mechanism, the second gear to engage with the gear transmission mechanism.

Still further, provided according to the invention is a cassette tape deck which comprises: a head stand which can reciprocate in a direction substantially perpendicular to a tape running direction; a magnetic head mounted on the head stand in such a manner that the magnetic head is rotatable between two angular positions and about an axis which is substantially parallel to the direction of movement of the head stand; tape-running-direction switching means for selecting a tape running direction separately according to the two angular position of the magnetic head; a head stand driving mechanism including a first gear rotated to reciprocate the head stand; a head rotating mechanism including a second gear rotated to rotate the magnetic head; a single drive source; torque applying means, including a gear transmission mechanism engageable with said first and second gears for applying torque from said single drive source to the first and second gears; and trigger means for causing, after said first gear is engaged with said gear transmission mechanism, said second gear to engage with said gear transmission mechanism, said trigger means comprising: control plate reciprocable between a maximum "go" position and a maximum "return" position and moved forwards by rotation of said first gear, said control plate having a regulating part which, when said control plate is out of a maximum "return" position, engages with said second gear to prevent rotation of said second gear; means for urging said control plate in a backward movement direction thereof; means for inhibiting backward movement of said control plate when said control plate reaches said maximum "go" position and releasing inhibition in response to an initial turn of said first gear; and means for urging said first and second gears to engage with said gear transmission mechanism, said head stand being caused to make a reciprocation by turning said first gear through 360°, and said magnetic head being rotated through 180°, by turning said second gear through 180°.

Yet further, provided according to the invention is a cassette tape deck which comprises: a head stand which can reciprocate in a direction substantially perpendicular to a tape running direction; a magnetic head mounted on said head stand in such a manner that the magnetic head is rotatable between two angular positions and about an axis which is substantially parallel to the direction of movement of the head stand; tape-running-direction switching means for selecting a tape running direction separately according to the two angular positions of the magnetic head; a head stand driving mechanism including a first gear rotated to reciprocate the head stand; a head rotating mechanism including a second gear rotated to rotate the magnetic head; torque applying means, including a gear transmission mechanism engageable with said first and second gears for applying torque from a single drive source to the first and second gears; and trigger means for causing, after the first gear is engaged with the gear transmission mechanism, the second gear to engage with the gear transmission mechanism, the trigger means comprising: a control plate reciprocable between a maximum "go" position and a maximum "return" position and moved forwards by rotation of the first gear, the control plate having a regulating part which, when the control plate is out of the maximum "return" position, engages with the second gear to prevent the rotation of the second gear; means for urging the control plate in a backward movement direction thereof; means for inhibiting the backward movement of the control plate when the control plate reaches the maximum "go" position and releasing the inhibition in response to an initial turn of the first gear; and means for urging the first and second gears to engage with the gear transmission mechanism, the head stand being caused to make one reciprocation by turning the first gear through 360°, and the magnetic head being rotated through 180° by turning the second gear through 180°, the speed ratio of the first and second gears being 1:1.

BRIEF DESCRIPTION OF THE DRAWINGS

FIGS. 3 through 8 are perspective views showing parts of the internal structures in more detail;

DESCRIPTION OF THE PREFERRED EMBODIMENTS

Figure 1:
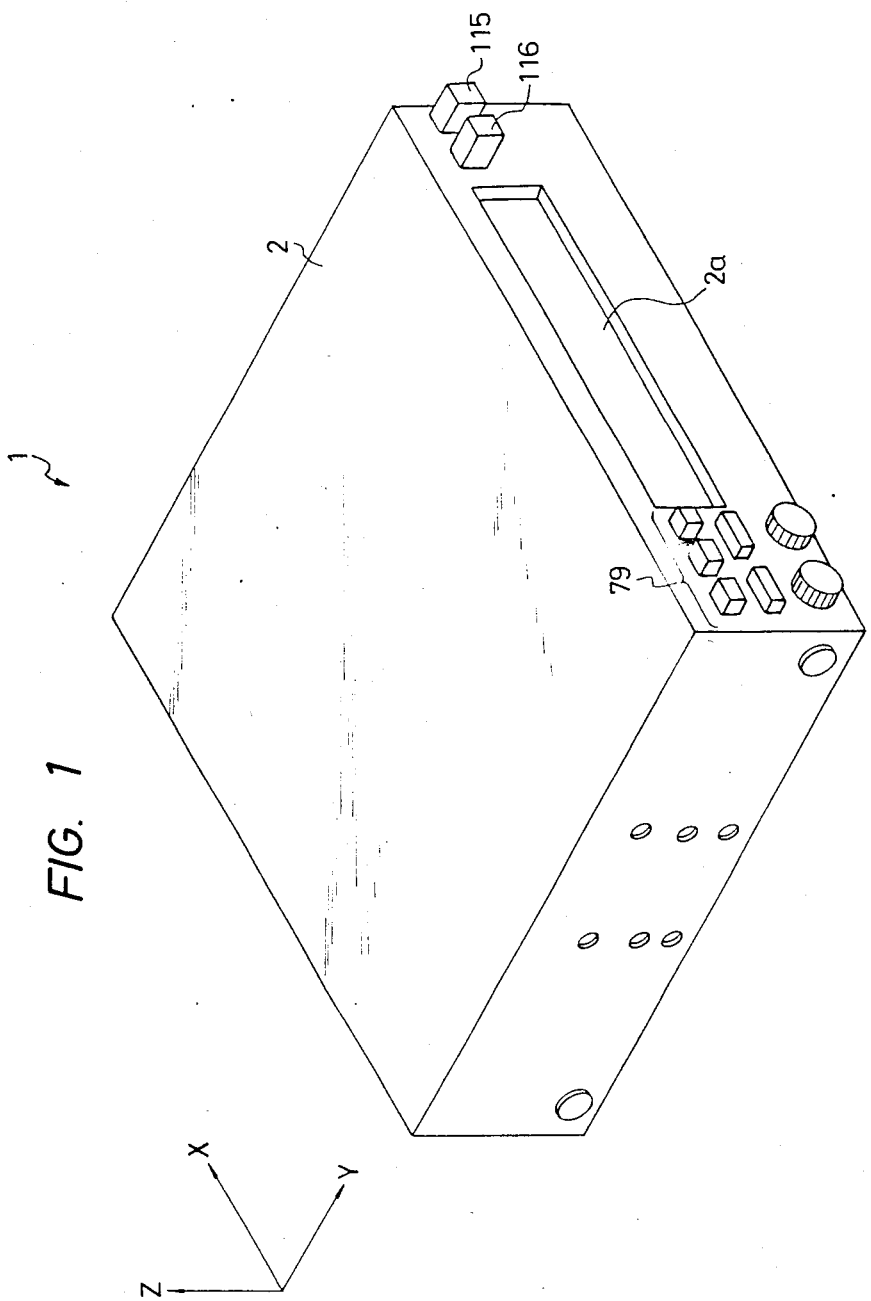
FIG. 1 is a perspective view showing the external appearance of a cassette tape deck according to the invention.

A cassette tape deck constructed in accordance with the invention will be described with reference to the accompanying drawings.

In the drawings, reference 1 designates the overall cassette tape deck.

Further as shown in FIG. 1, an elongated rectangular opening 2a for receiving a cassette (described later) is formed in the front wall of a housing 2. (The term "front" as used herein refers to the direction of the arrow Y in FIG. 1, and the terms "right" and "left" are determined with respect to the direction of the arrow Y. Therefore, the "left" direction is the direction of the arrow X. The direction of the arrow Z is the upward direction.)

As shown in FIGS. 2 and 3 and FIGS. 9 and 10, a chassis 3, made of steel or the like, is provided in the housing 2. As shown in FIG. 4 also, a pair of reel units 5 are juxtaposed in the direction of the arrow Y on the chassis 3 and rotatably mounted on the chassis 3. As is apparent from FIG. 11, each reel unit 5 has a rotating support shaft 5a secured to the chassis 3. A reel 5b is rotatably mounted on the rotating support shaft 5a. A collar 5c is fitted on the upper end portion of the reel 5b, and a bushing 5d is fitted on the lower end portion of the reel 5b. The collar 5c can be inserted into a cassette reel of the above-described cassette and on which a magnetic tape is wound.

The reel 5b has a disc-shaped large diameter part 5e at the middle. A double-gear 5f having large and small gear sections is arranged between the large diameter part and the bushing 5d, and is rotatably mounted on the rotating support shaft 5a. A coil spring 5g is interposed between the double-gear 5f and the bushing 5d to urge them apart from each other. A felt plate 5h is provided between the large diameter part 5e of the reel 5b and the double-gear 5f. More specifically, the felt plate 5h is bonded to the large diameter part 5e, and is slidably abutted against the double gear 5f. An arm 5i is disposed between the upper surface of the large diameter part 5e and the collar 5c. One end portion of the arm 5i is rotably mounted on the cylindrical outer wall of the reel 5b. The lower surface and the upper surface of the arm 5i are slidably engaged with the large diameter part 5e of the reel 5b and the collar 5c through washers 5j and 5k, respectively. A coil spring 51 is interposed between the upper washer 5k and the arm 5i to urge the arm downwardly.

Figure 18:
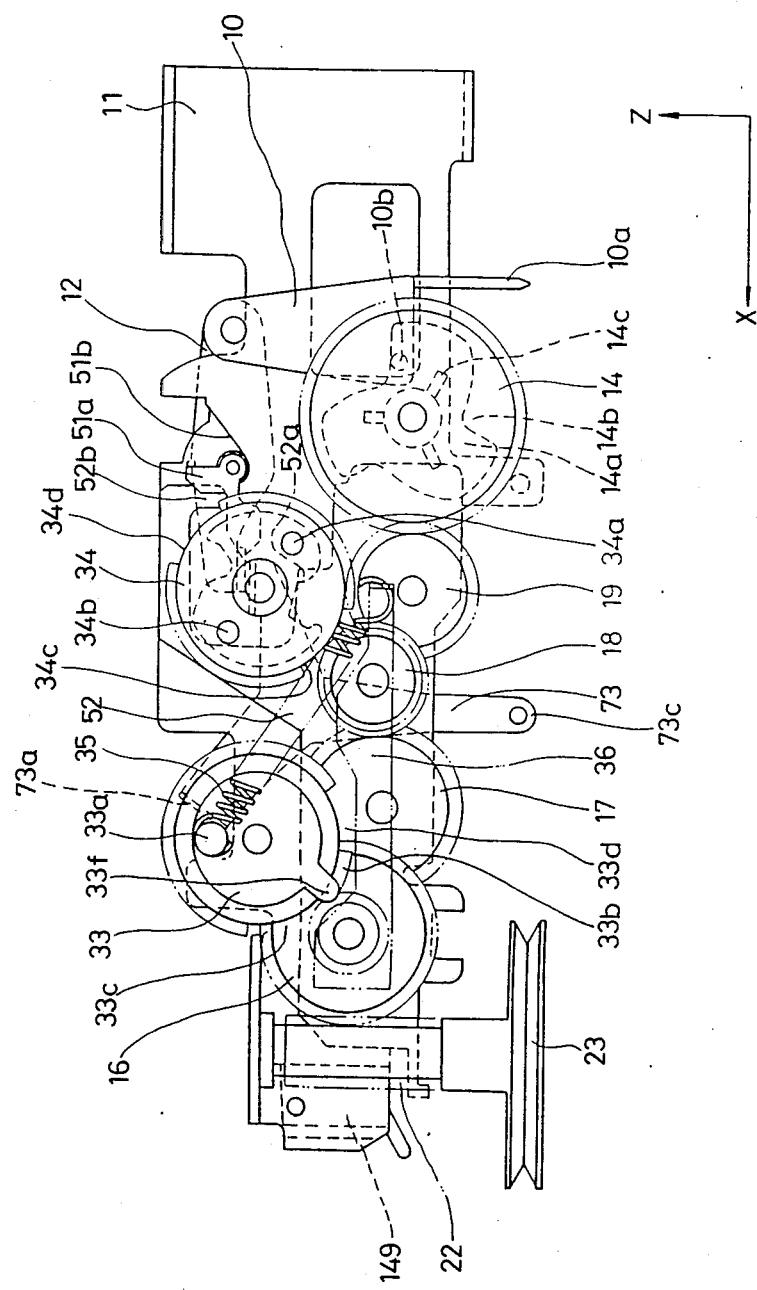

As shown in FIGS. 2, 3, 9 and 10, an intermediate lever 7 is arranged on the right-hand side of the reel units 5, extending substantially in the front-to-rear direction. The lever 7 is mounted on a pin 7a fixed to the chassis 3 in such a manner that the lever 7 is swingable in a plane parallel with the major surface of the chassis 3. A rectangular opening 7b is formed in the front end portion of the lever 7. The opening 7b is loosely engaged with a pin 8a which protrudes from the center of a swinging lever 8 which is swingably provided on the chassis 3. Two pins 8b are fixed in both end portions of the swinging lever 8. The pins 8b are slidably engaged with corresponding elongated holes 5m which are formed in the free end portions of the reel units 5. As shown in FIGS. 7 and 18 also, an end detecting lever 10 is provided near the rear end portion of the intermediate lever 7. The lever 10 is pivotally mounted on one turning end portion of a lever A 12 (the right end of the lever A in this embodiment), which is rotatably mounted on a sub-chassis A 11. The sub-chassis A is secured to the upper surface of the rear end portion of the chassis 3. A protrusion 10a extends downwardly from the lower end of the end detecting lever 10, and is slidably engaged with a cut 7c formed in the rear end portion of the intermediate lever 7.

Figure 9:
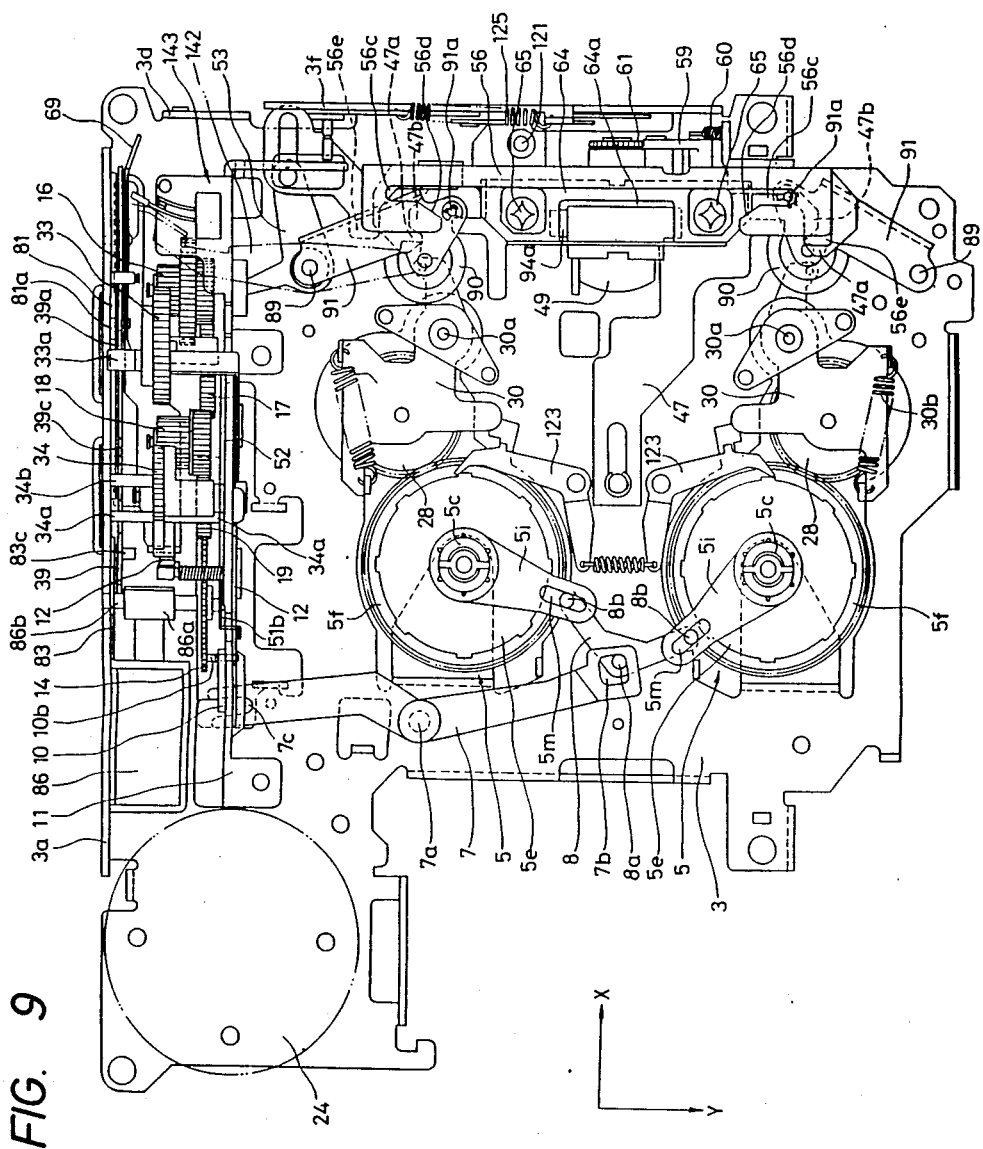
FIGS. 9 and 10 are a top view and a bottom view, respectively showing these internal structures.

As shown in FIGS. 7, 9 and 18, a pin 10b is fixed to the rear of the lower end portion of the end detecting lever 10. The pin 10b is engaged with an end detecting gear 14 rotatably mounted on the sub-chassis A and confronts the rear end face of the end detecting lever 10. As is apparent from FIGS. 7 and 18, a recess 14a is formed in the surface of the end detecting gear 14, which recess 14a confronts the end detecting lever 10. Three protruding parts 14b, which are similar in configuration to one another and are substantially in the form of a triangle, are formed along the peripheral wall of the recess at intervals of 120° in such a manner that they extend radially of the end detecting lever. Furthermore, three protrusions 14c, which are similar in configuration to one another, are provided in the central portion of the recess 14a in such a manner that they radially extend from the center of the recess towards the spaces between the triangular protruding parts 14b. The protruding parts 14b and the protrusions 14c are designed so that the diameter of a circle touching internally the tops of the protruding parts 14b is substantially equal to that of a circle touching externally the outer ends of the protrusions 14c. The pin 10b fixed to the end detecting lever 10 can be engaged with the protruding parts 14b and the protrusions 14c.

The above-described reel units 5, intermediate lever 7, swinging lever 8, end detecting lever 10, and end detecting gear 14 forms a part of a tape end detecting mechanism for detecting the end of a magnetic tape being played.

As shown in FIGS. 2, 7, 9 and 18, a gear transmission mechanism 20 composed of four gears 16, 17, 18 and 19 engaged in series is provided behind the subchassis 11 and on the left side of the end detecting gear 14. The end detecting gear 14 is engaged with the last gear 19 of the gear transmission mechanism. As shown in FIG. 18, the first gear 16 of the gear transmission mechanism 20 (reference numeral 20 being not indicated in FIG. 18) is engaged with a worm 22 which is rotatably mounted on the sub-chassis A 11. A pulley 23 is fixedly mounted on the lower end portion of the worm 22. The pulley 23 is rotated through a belt 25 by an electric motor 24 located at the right rear end portion of the chassis 3. The belt 25 is laid directly on a small pulley 24a which is fitted on the output shaft of the motor 24.

Figure 10:
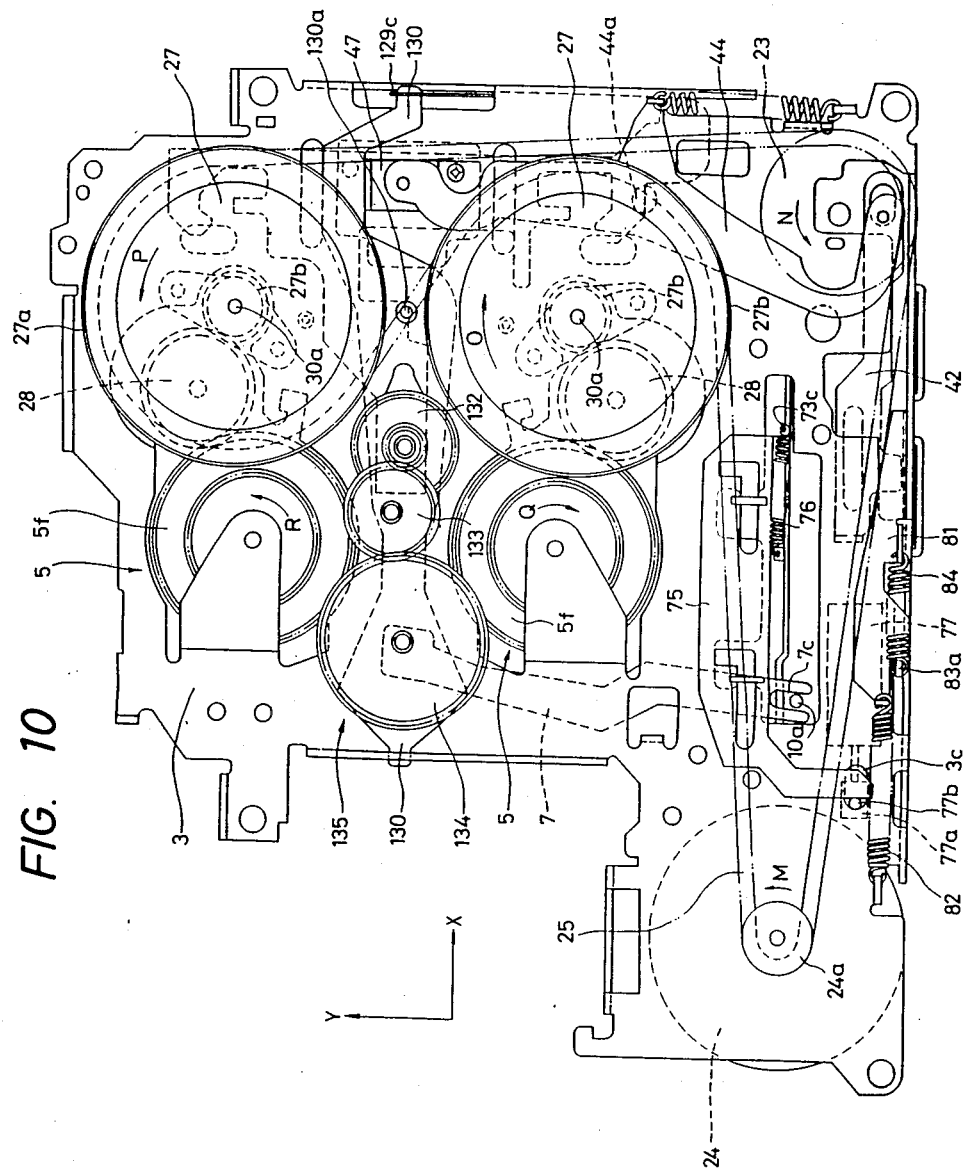

As is apparent from FIG. 10, the belt 25 is further laid over a pair of flywheels 27 rotatably mounted on the lower surface of the chassis 3. In this connection, it should be noted that the direction of the arrow M is the forward direction of rotation of the motor. The belt 25 is laid over the pulley 23 and the flywheels 27 so that, when the motor is rotated in the direction of the arrow M, the pulley 23 is rotated in the direction of the arrow N while the flywheels 27 are rotated in the directions of the arrows O and P.

Each flywheel 27 has a large gear 27a formed in its outer periphery and a small gear 27b formed in its inner periphery. The small gears 27b are engaged with the large diameter gears of the double-gears 5f in the direction of the arrow Y. As is clear from FIGS. 2, 3 and 9, each idler gear 28 is rotably mounted on one end portion of a support lever 30 which is swingably mounted on a shaft member 30a fixed to the chassis 3. Therefore, as the support lever swings, the idler gear 28 is moved into or out of engagement with the double gear 5f of the reel unit 5. Each support lever 30 is urged by a coil spring 30b in such a manner that idler gear 28 is moved towards the double gear 5f.

As shown in FIGS. 2, 7, 9 and 18, a first gear 33 and a second gear 34 are rotatably mounted above the gears 16 through 19 on the rear side of the sub-chassis A 11. The first gear 33 is engaged with the gear 16 of the gear transmission mechanism 30 (see FIG. 7, for instance), and the second gear 34 is engaged with the gear 18 of the gear transmission mechanism 20.

The gear transmission mechanism 20, the worm 22, the pulley 23 and the belt 25 form a torque applying mechanism for applying the torque of the motor 24 (a single drive source) to the first gear 33 and the second gear 34. The torque applying mechanism and the motor 24 form a torque applying unit used to rotate the first and second gears 33 and 34.

The first gear 33 reciprocates a head stand, to be described below. First, however, a structure for coupling the first gear to the head stand will be described.

As shown in FIGS. 7 and 18 for instance, a pin 33a is fixed to the rear surface of the first gear 33. One end of a coil spring 35 is fastened to the pins 33a so that the first gear 33 is urged clockwise in FIG. 18. The other end of the coil spring 35 is connected to a plate 36 which is secured to the end portions of rotating support shafts (not shown) for the gears 16 and 18.

As shown in FIGS. 2, 3, 9 and 11, a bent part 3a, formed along the rear edge of the chassis 3 and behind the sub-chassis A 11, is shaped in such a manner that it extends upwardly and in parallel with the sub-chassis A. As shown in FIG. 4 also, a control plate 39 is mounted in front of the bent part 3a in such a manner that it is movable right and left. The position where the movement of the control plate 39 to the left is limited is referred to as a maximum "go" position. Similarly, the position where the movement of the control plate to the right is limited is referred to as a maximum "return" position.

Figure 2:
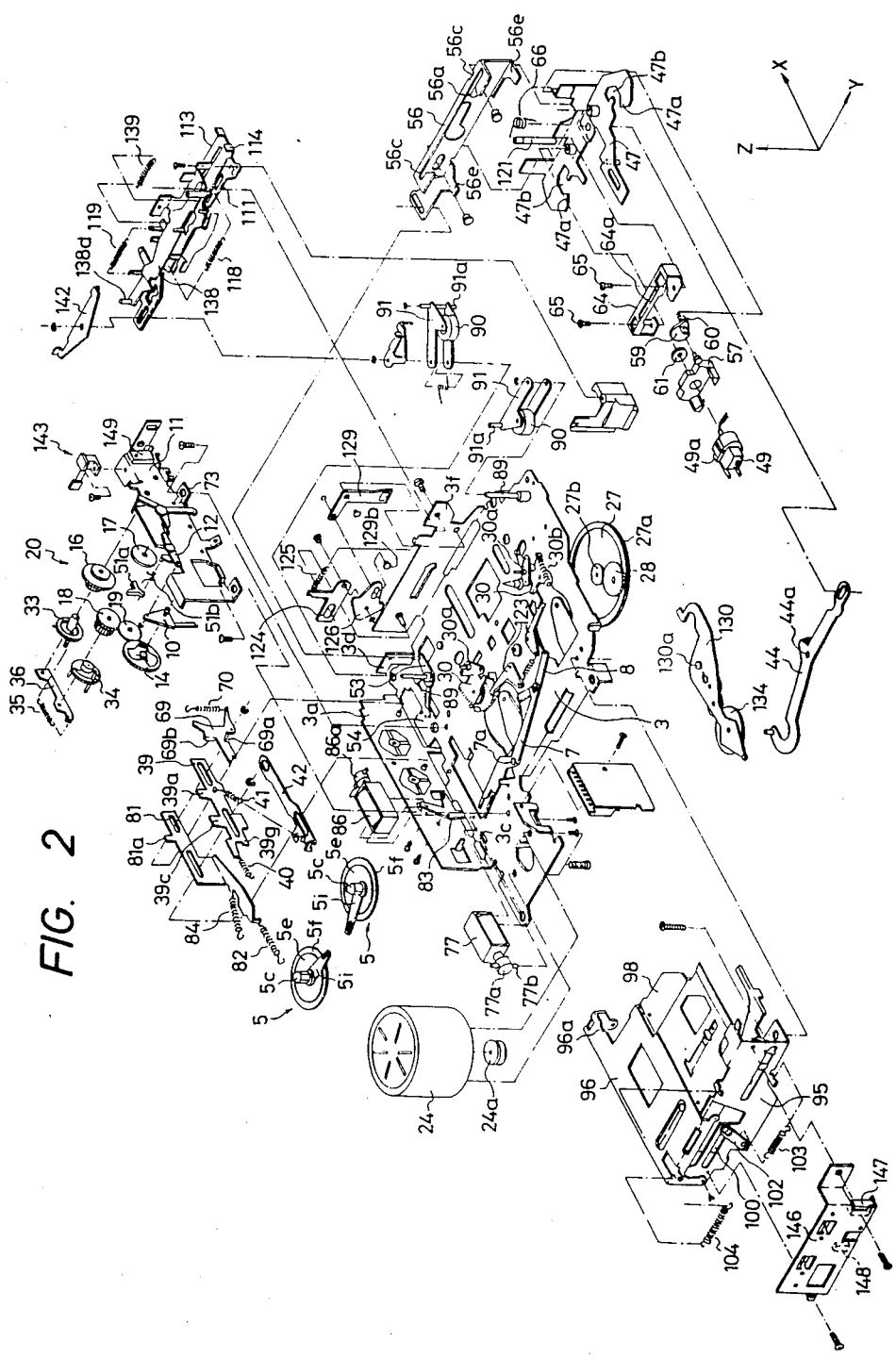
FIG. 2 is an exploded perspective view showing internal structures of the cassette tape deck.
Figure 8:
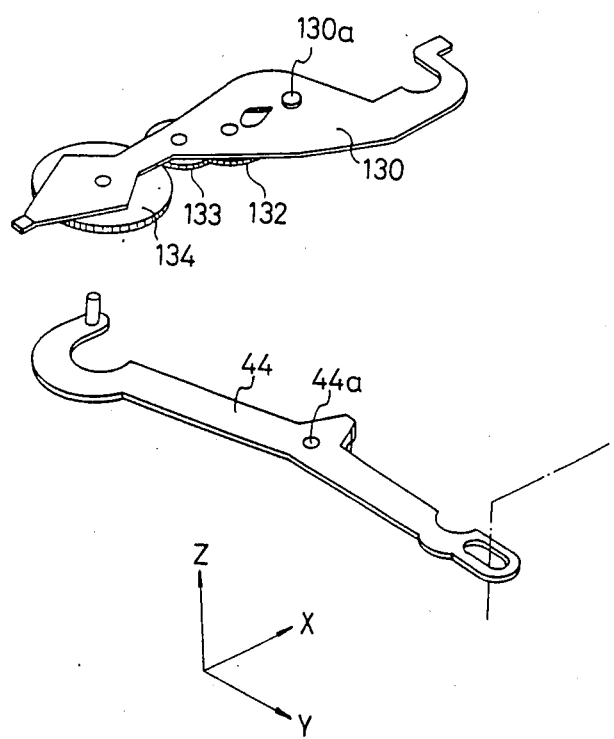

A coil spring 40 is connected to the right end of the control plate 39 to urge the latter to the right. A protrusion 39a extends from the substantially central portion of the upper edge of the control plate 39. The pin 33a of the first gear 33 is engageable with the protrusion 39a. That is, the right edge of the protrusion 39a is engaged with the pin 33a, and therefore the control plate 39 is caused to move as the first gear 33 rotates. As shown in FIGS. 2, 4 and 10, a lever B 42 is arranged below the control plate 39. The lever B 42 is coupled through a coil, spring 41 to the control plate, and therefore the lever is moved to the left as the control plate moves. A protrusion 42a, formed at the right end of the lever B 42, engages with the right edge of the protrusion 39b extending from the lower edge of the control plate 39. Therefore, the lever B 42 is moved to the right as the control plate 39 is caused to return by the coil spring 40. As is apparent from FIGS. 2, 8 and 10, the left end of the lever B 42 is pivotally coupled to the rear end of a lever C 44, which extends in the direction of the arrow Y under the chassis 3 and is swingable mounted, at the central portion, on a pin 44a fixed to the chassis 3. The front end of the lever C 44 is pivotally coupled to a head stand 47, which is movable to right and left. The magnetic tape is run in the direction of the arrow Y. The direction of movement of the head stand 47 is perpendicular to the tape running direction.

The first gear 33, the control board 39, the coil springs 40 and 41, the lever B 42, the lever C 44, and their related components form a head stand driving mechanism adapted to drive the head stand 47.

Next, the second gear 34 and its relevant members will be described. The second gear 34 is to turn a magnetic head 49 mounted on the head stand 47. The second gear 34 is positioned farther from the head stand 47 than the first gear 33. The speed ratio of the first gear 33 and the second gear 34 is 1:1.

As is apparent from FIGS. 7 and 18, two stop pins 34a and 34b are fixed to the rear surface of the second gear 34 at intervals of 180°. The stop pin 34a penetrates the second gear 34 so as to appear at the front surface of the second gear. The stop pins 34a and 34b can engage with the right edge of a protrusion 39c extending from the upper edge of the control plate 39. That is, the control plate 39 is reciprocated also by the two stop pins. A pawl member 51a and a spring member 51b are provided near the second gear 34 so as to urge the latter clockwise in FIG. 18. As shown in FIG. 18, a movable plate 52 made of steel is provided behind the sub-chassis A is freely movable to the right and to the left. Pawls 52a and 52b are formed at the right end of the movable plate 52. The pawls 52a and 52b are engageable with the stop pin 34a protruding from the front surface of the second gear 34. The right edge of the pawl 52a is engaged with the stop pin 34a, and the left edge of the pawl 52b is engaged with the stop pin 34a. That is, the movable plate is reciprocated whenever the second gear 34 turns through 180° in one direction.

Figure 3:
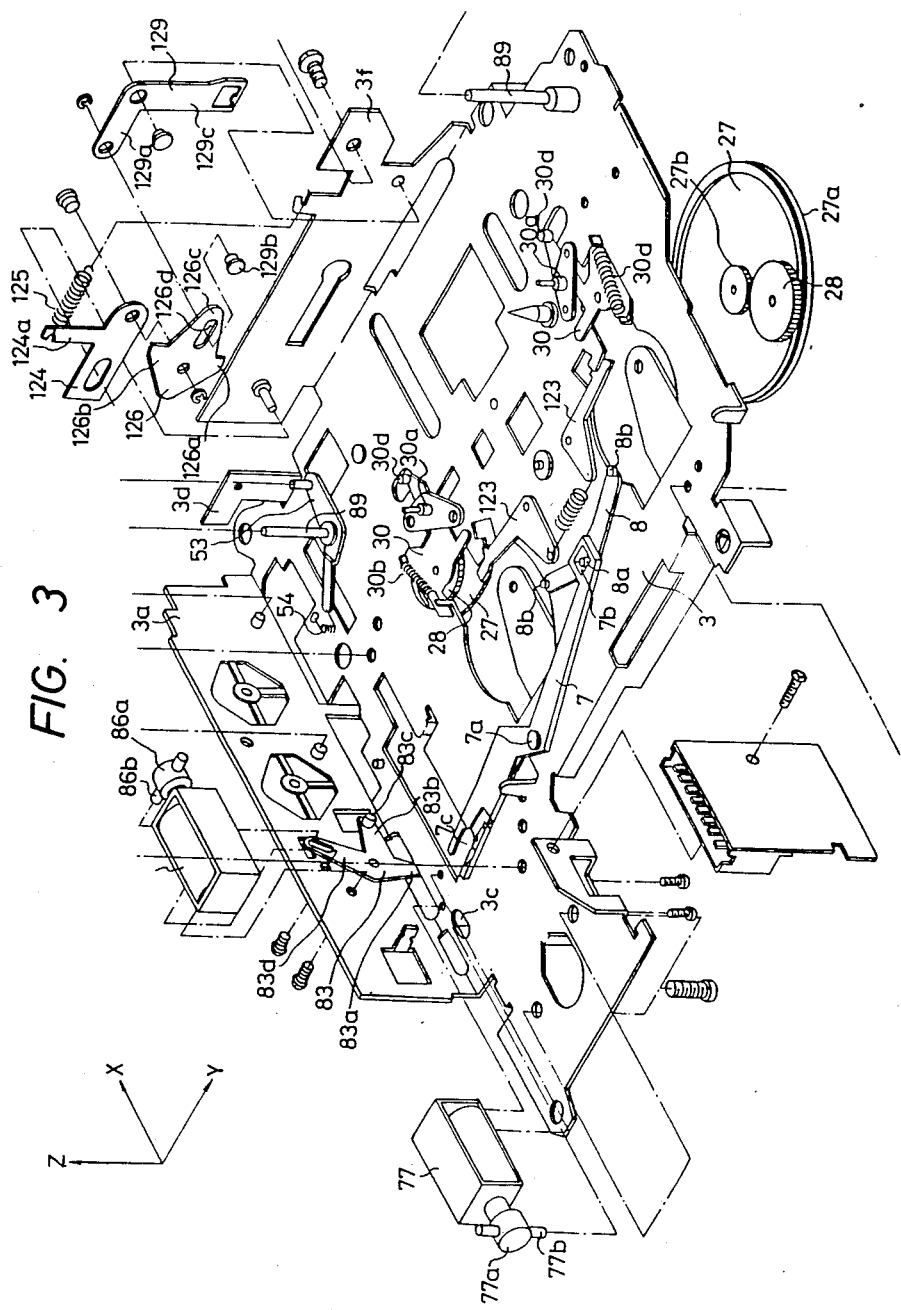
Figure 4:
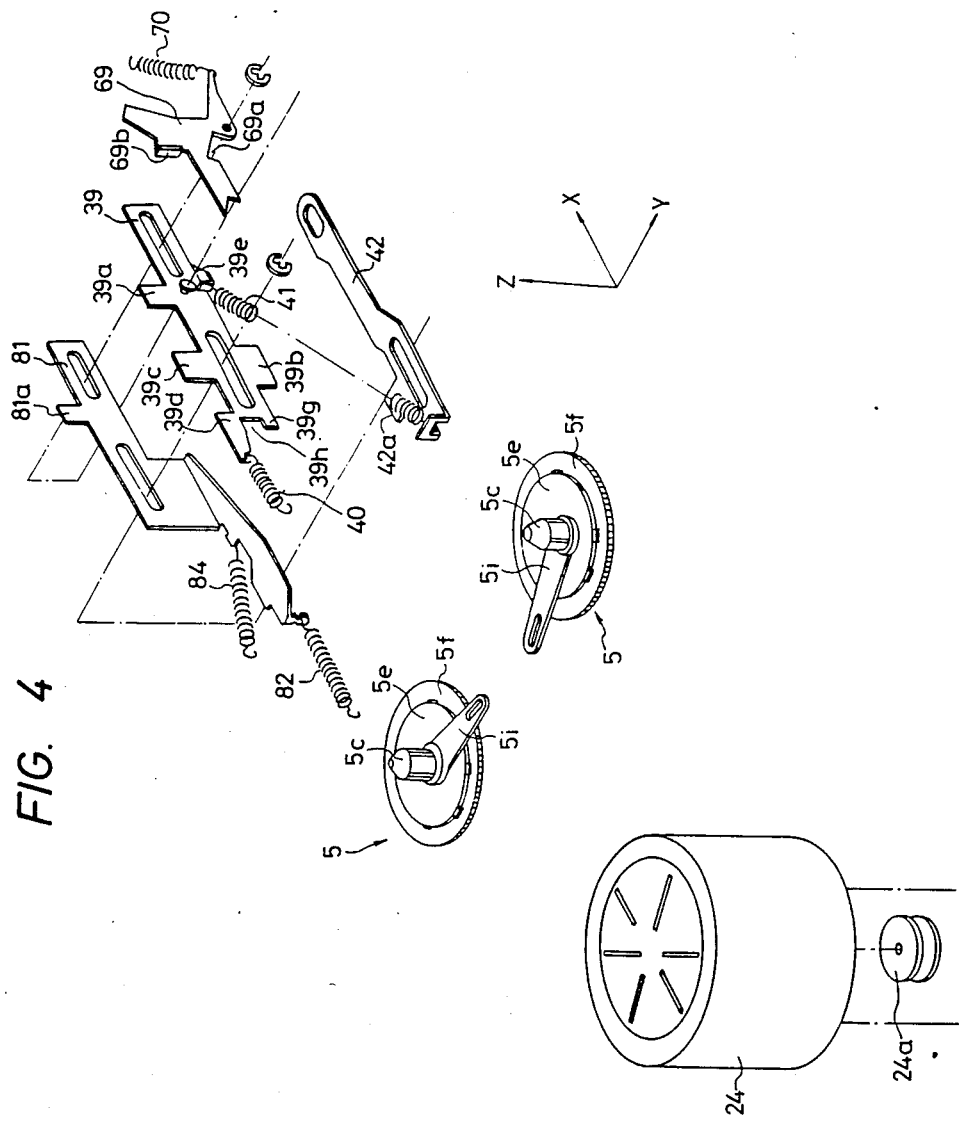

As shown in FIGS. 2, 3 and 9, a substantially L-shaped lever D 53 is provided near the left end of the movable plate 52. The lever D 53 is mounted on the chassis 3 in such a manner that it is swingable about its central bent point. The lever D 53 is urged by a spring 54 (see FIG. 3) so that it operates with a click action. The left end portion of the movable plate 52 is pivotally coupled to the rear end portion of the lever D 53. The front end portion of the lever D 53 is pivotally coupled to the rear end portion of a slide member 56 (shown in FIG. 5 also) which is mounted on the head stand 47 in such a manner as to be freely reciprocated along the arrow Y.

Figure 5:
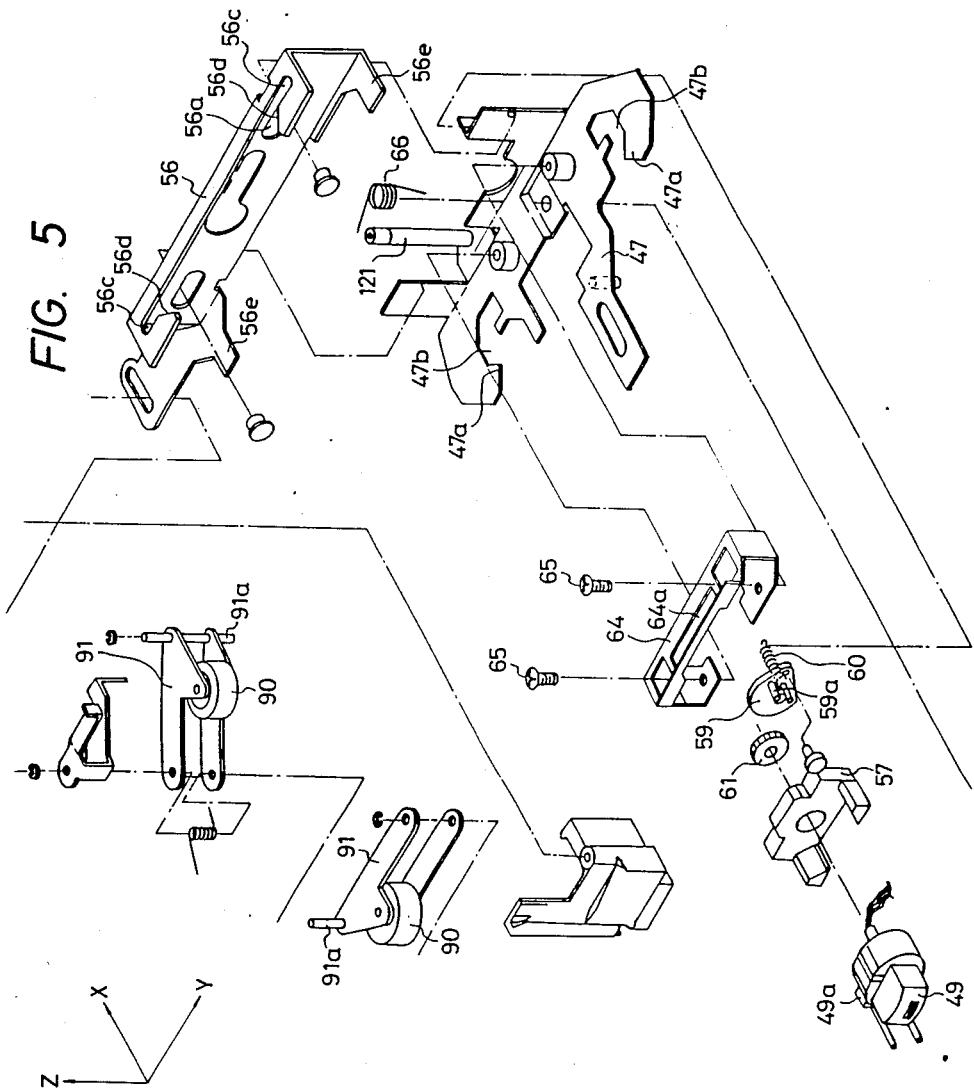

As shown in FIGS. 2, 5 and 9, the magnetic head 49 is arranged on the right side of the slide member 56. The magnetic head 49 is supported by a bearing member 57 secured to the head stand 47 in such a manner that the head is rotatable about an axis parallel to the direction of movement of the head stand 47, i.e., an axis perpendicular to the surface of the magnetic head which the magnetic tape contacts. The rotating shaft of the magnetic head 49 is made of a die-cast alloy, while the material of the bearing member 57, which engaged with the rotating shaft, is made of a glass-fiber-contained PPS resin. The angular position of the magnetic head 49 shown in FIG. 5 is referred to as a first angular position of the magnetic head, and the position of the magnetic head turned through 180° from the first angular position is referred to as a second angular position thereof. The magnetic head 49 can freely turn between the first angular position and the second angular position.

A sector-shaped gear 59 is arranged in such a manner that the slide member 56 is disposed between the gear 59 and the bearing member 57. The sector-shaped gear 59 is coupled, at its pivot, to the front end portion of the bearing member 57 in such manner that it is freely rotatably. However, in order to eliminate the difficulty of the coupling part of the sector-shaped gear 59 and the bearing member 57 disturbing the reciprocation of the slide member, an elongated hole 56a with which the coupling part is freely engaged is formed, extending in the direction of the arrow Y. The sector-shaped gear 59 is urged by a coil spring so that it operates with a click action. A pin 59a is fixed to the right surface of the gear 59 and is pivotally coupled to the slide member 56. That is, the sector-shaped gear 59 is swung as the slide member 56 reciprocates. The sector-shaped gear 59 is engaged with a gear 61 which is coaxially secured to the rotating shaft of the magnetic head 49.

A head rotating mechanism for rotating the magnetic head 49 is made up of the above-described second gear 34, movable plate 52, lever D 53, spring 54, slide member 56, bearing member 57, sector-shaped gear 59, coil spring 60, gear 61, and their related small components. The head rotating mechanism together with the above-described head stand driving mechanism forms a control mechanism. That is, the control mechanism reciprocates the head stand 47 and turns the magnetic head 49. As is apparent from the above description, the head stand 47 is reciprocated by rotation through 360° of the first gear 33, and the magnetic head 49 is turned through 180° by rotation through 180° of the second gear 34.

Next, an azimuth adjustment unit for regulating the angle of the magnetic head 49 will be described.

As shown in FIGS. 5 and 9 also, a regulating member 64, extending in the front-to-rear direction, is provided on the head stand 47, surrounding the magnetic head 49. The regulating member 64 is made of a steel plate and is flexible. The regulating member 64 is symmetrical in the front-to-rear direction, and it is secured at its middle part to the head stand 47. The front and rear end portions of the regulating member 64 are engageable with the periphery of the magnetic head. More specifically, the front and rear end portions of the regulating member 64 are designed so as to hold the magnetic head, and are substantially U-shaped in section. The lower part of the U-shaped end portion is engaged with a protrusion 49a extending from the periphery of the magnetic head 49, thereby to regulate the turning of the magnetic head 49. An opening 64a is formed in the upper surface of the regulating member 64 so that, when the magnetic head 49 turns, the protrusion 49a cannot strike the regulating member 64. The front and rear end portions of the regulating member 64 are engaged with the heads of a pair of screws 65, which are screwed into the head stand 47. A pair of springs 66 are interposed between the head stand 47 and the lower surfaces of the front and rear end portions of the regulating member 64 so as to urge the front and rear end portions upwardly (only one spring 66 being shown in FIG. 5). The screws 65 and the springs 66 form a positioning unit for positioning the two end portions of the regulating member 64 form the azimuth adjustment unit. That is, by adjustment of the screws 65 the angles of the magnetic head 49 at the two angular positions can be adjusted.

The regulating member 64 may be divided at the middle into two parts. Each of the two parts is secured to the head stand 47 in such a manner that it acts like a cantilever above the magnetic head 49. In this case also, the same effect can be obtained. However, in the case where the regulating member is a single part whose front and rear end portions are symmetrical, the number of components is reduced and the number of manufacturing steps is also decreased; that is, the cassette tape deck manufacturing cost can be decreased.

As shown in FIG. 18 for instance, the first gear 33 has a partial toothed part 33b having about three teeth, and two toothless parts 33c and 33d on both sides of the partial toothed part 33b. When the first gear 33 is at rest before operation, the toothless part 33c confronts the gear 16 (a part of the gear transmission mechanism 20), and engagement of the partial gear 33b with the gear 16 is prevented by a start trigger lever (described below). On the other hand, the second gear 34 has also two toothless parts 34c and 34d at intervals of 180°. When the second gear 34 is at rest before operation, the toothless part 34c confronts the gear 18 (a part of the gear transmission mechanism 20), and, as described below, rotation of the second gear is prevented so that the toothed part cannot engage with the gear 18.

A trigger unit will now be described which, when the first and second gears 33 and 34 rotate, causes the second gear to engage with the gear 18 after the gear 33 engages with the gear 16.

As shown in FIG. 4, a regulating part 39d is formed at the rear end of the control plate 39. The regulating part 39d engages the stop pins 34a and 34b of the second gear 34 to prevent the rotation of the second gear when the control plate is not at the maximum return position (right-movement limit position).

Figure 17:
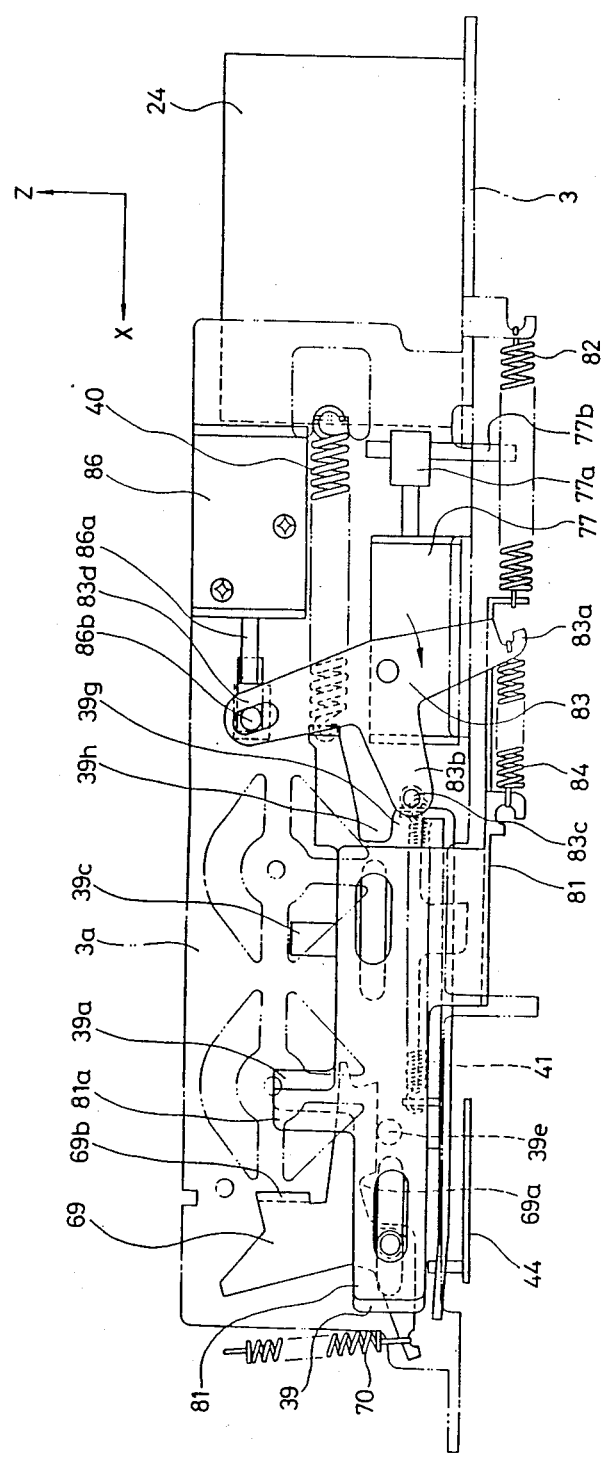

As shown in FIGS. 2, 4 and 17, an inhibiting lever 69 is arranged on the left side of the control plate 39. The inhibiting lever 69 is coupled to the bent part 3a of the chassis 3 in such a manner that it is swingable about its lower end. An engaging recess 69a is formed in the inhibiting lever 69. The recess 69a is engageable with a pin 39e fixed to the front surface of the middle part of the control plate 39. The inhibiting lever 69 is urged clockwise in FIG. 17 by a coil spring 70. The inhibiting lever 69 and the coil spring 70 form an inhibiting unit which inhibits the backward movement (to the right) of the control plate 39 when the latter 39 reaches the maximum "go" position (left-movement limit position) being moved forwardly.

On the other hand, as shown best in FIG. 7, a protrusion 33f is formed on the periphery of the first gear 33 which can be engaged with the engaging protrusion 69b of the inhibiting lever 69. That is, when the first gear 33 is initially driven, the protrusion 33f of the first gear 33 is engaged with the engaging protrusion 69b to swing the inhibiting lever 69 counterclockwise in FIG. 17, thereby to release the control plate 39 whose backward movement has been inhibited at the maximum "go" position.

The trigger unit which, when the first and second gears 33 and 34 start rotation, causes the second gear 34 to engage with the gear 18 after the first gear 33 has been engaged with the gear 16, is made up of the above-described inhibiting unit (including the inhibiting lever 69), the control plate 39, a coil spring 40 which urges the control plate in the direction of backward movement (to the right), a coil spring 35 which urges the first gear 33 so that the partial tooth part 33b of the first gear 33 engages with the gear 16 (a part of the gear transmission mechanism 20), a pawl member 51 and a spring member 51a which urges the second gear 34 so that the toothed part of the second gear 34 engages with the gear 18 (a part of the gear transmission mechanism 20).

As shown in FIGS. 2, 7, 9 and 18, a three-pronged start trigger lever 73 is provided on the middle portion of the front surface of the sub-chassis A 11 which is rotatably about its center. As is apparent from FIGS. 7 and 18, one end portion 73a of the start trigger lever 73 is bent 90° backwardly, and the bent part is engageable with the first gear 33. More specifically, the pin 33a protruding from the rear surface of the first gear 33 penetrates the latter; that is, the pin 33a protrudes also from the front surface of the first gear 33 as required to engage with the end portion 73a of the start trigger lever 73, thereby to prevent the rotation of the first gear 33. A second end portion 73b of the start trigger lever 73 extends leftwardly and engages the left end portion of the lever A 12 from below. That is, the second end portion 73b of the start trigger lever 73 is engaged with the end detecting lever 10 through the lever A 12. Therefore, as the end detecting lever 10 moves upwardly, the start trigger lever 73 is turned clockwise in FIG. 18, thus releasing the first gear 33, the rotation of which has been prevented. The start trigger lever 73 has a third end portion 73c which extends downwardly. The third end portion 73c is engaged with the left end of a magnetic head switching instruction rod 75 shown in FIG. 10. The rod 75 is mounted on the chassis 3 in such a manner that it is freely reciprocatable to the right and left. The rod 75 is made of steel plate, and is substantially L-shaped. As the rod 75 is moved to the left, the start trigger lever 73 is turned clockwise in FIG. 18. As shown in FIG. 10 a coil spring 76 is arranged near the rod 75 to urge the third end portion 73c of the start trigger lever 73 to the right. As shown in FIGS. 2, 3 and 17, an electromagnetic solenoid 77 is arranged near the motor 24, extending in the right-to-left direction, and is secured to the chassis 3. The movable rod 77a of the solenoid 77 protrudes from the solenoid body to the right. A pin 77b is fixedly inserted in the end portion of the movable rod 77a in such a manner that it extends vertically. The lower end portion of the pin 77b is loosely fitted in an elongated hole 3c which is cut in the chassis 3, extending in the right-to-left direction, and the lower end portion is engaged with the right end of the magnetic head switching instruction rod 75. That is, the rod 75 is moved to the left (and accordingly the start trigger lever 73 is turned clockwise in FIG. 18) by pulling the movable rod 77a of the solenoid 77.

As shown in FIG. 1, a group of switches 79 is arranged on the front wall of the housing 2 and on the right side of the opening 2. One of the switches is a switching instruction switch for operating the electromagnetic solenoid 77. As shown in FIGS. 2, 4, 10 and 17, a moving member 81 is mounted on the front surface of the bent part 3a of the chassis 3 and is movable to the right and left, i.e., in the direction of movement of the control plate 39. The moving member 81 is disposed between the bend part 3a and the control plate 39. A protrusion 81a is extended from the upper edge of the left end portion of the moving member 81. The pin 33a of the first gear 33 is engageable with the right edge of the protrusion 81a. That is, as the first gear 33 rotates, the moving member 81a together with the control plate 39 is moved to the left. A coil spring 82 is connected to the right end of the moving member 81 to urge the latter to the right.

As shown best in FIG. 3, a T-shaped lever E 83, arranged on the right side of the moving member 81, is mounted on the bent part 3a of the chassis 3 in such a manner that it is rotatable about its substantially central part. The lever E 83 has a first end portion 83a extending downwardly. The first end portion 83a is coupled through a coil spring 84 to the rear end of the moving member 81. That is, as the moving member 81 moves to the left, the lever E 83 is turned clockwise in FIG. 17. The lever E 83 has a second end portion 83b extending to the left. A pin 83c is fixed to the end of the second end portion 83b extending forwardly. The pin 83c is engageable with a protrusion 39g and a cut 39h provided at the rear end portion of the control plate 39. When the pin 83c is engaged with the cut 39h, the control plate 39 can move to the maximum "return" position (right-movement limit position). When the pin 83c is engaged with the protrusion 39g, movement of the control plate to the maximum "return" position is prevented. As described above, when the control plate 39 is not at the maximum "return" position, the regulating part 39d of the control plate 39 engages with the stop pins 34a and 34b of the second gear 34 to prevent the rotation of the second gear.

As shown in FIGS. 2, 3, 9 and 17, an electromagnetic solenoid 86 is mounted above the electromagnetic solenoid 77, arranged parallel to the solenoid 77. The solenoid 86 is fixedly mounted on the chassis 3. The movable rod 86a of the electromagnetic solenoid 86 protrudes from the solenoid body to the left. A pin 86b is fixedly inserted into the end portion of the movable rod extending in the front-to-rear direction. The pin 86b is pivotally coupled to the end of a third end portion 83d of the lever E 83. The third end portion 83d extends upwardly. When the movable rod 86a is pushed out (as shown in FIG. 17), the pin 83c of the lever E 83 is engaged with the protrusion 39g of the control plate 39.

The electromagnetic solenoid 86 is driven by operating the key switch of the automobile in which the cassette tape deck is installed. When the key switch is turned on, the movable rod 86a of the electromagnetic solenoid 86 is pulled in as the moving member 81 moves to the left, and the movable rod 86a is held pulled in. As a result, the pin 83c of the lever E 83 is engaged with the protrusion 39g of the control plate 39.

The above-described moving member 81, coil spring 82, lever E 83, coil spring 84, electromagnetic solenoid 86, and their related small components form an inhibiting and releasing unit which inhibits the return of the control plate to the maximum "return" position (right-movement limit position) when the electric power source is off, and which releases the inhibition when the power source is on.

Next, a tape running direction switching unit will be described.

As shown in FIGS. 2, 3 and 9, the shaft member 30a of a supporting member 30 which rotatably supports the idler gear 28 is employed as a capstan. As shown in FIG. 10, the shaft member 30a is further employed as the rotating support shaft of the flywheel 27. As shown best in FIGS. 3 and 5, a pair of support shafts 89 are provided on the chassis 3 and near the capstan 30a extending upwardly. A pair of arm members 91 between which a pinch roller 90 is rotatably mounted are rotatably mounted on each support shaft 89. The pair of pinch rollers 90 can be freely engaged with and disengaged from the capstan 30. A pin 91a penetrates the free end portions of the pair of arm members 91, extends vertically, and is fixedly secured to the free end portions. The left-edge lower-part of the pin 91a is engaged with one end of the spring 66 (see FIG. 5) for azimuth adjustment of the magnetic head 49. The arm members 91 are urged by the spring 66 in such a manner that the pinch roller 90 approaches the capstan 30a.

The above-described capstan 30a, pinch roller 90, reel units 5, idler gear 28, and related minor parts form the tape running direction switching unit used to determine tape running directions in correspondence to the two angular positions of the magnetic head 49.

The upper end portions of the pins 91a of the pairs of arm members 91 are engageable with the front end portion and the rear end portion of the slide member 56. More specifically, the front end portion and the rear end portion of the slide member 56 have two cuts 56c, respectively, which extend in the front-to-rear direction and have open ends confronted with each other. The pins 91a of the arm members 91 are alternately engaged with the respective cuts 56c as the slide member 56 reciprocates. The open end of each cut 56c merges with a tapered part 56d of the respective end portion of the slide member 56 so that the pin 91a is smoothly guided into the cut 56c by means of the tapered part 56d. When the pin 91a is engaged with the cut 56c, the arm members 91 swing to the left so that the pinch roller 90 is disengaged from the capstan 30a. That is, the pair of pinch rollers 90 are disengaged from the capstans 30 one at a time as the slide member 56, a part of the head rotating mechanism, reciprocates.

As is apparent from FIG. 5, the right and left end portions of the head stand 47 bearing the slide member 56 have respective triangular protrusions 47a whose tops confront with each other. Each triangular protrusion 47a merges with a cut 47b on its left side. When the head stand 47 is moved to the right, the protrusions 47a and the cuts 47b are engaged with pins 30d fixed to the swing end of the support levers 30 (FIG. 2). When the triangular protrusions 47a are engaged with the pins 30d, the supporting levers 30 are swung so that the idler gears 28 supported by the levers 30 are disengaged from the double-gears 5f of the reel units 5. When the pins 30d are engaged with the cuts 47b in succession with the protrusions 47a, the supporting levers 30 are returned so that the idler gears 38 are engaged with the double gears 5f.

The front and rear end portions of the slide member 56 has protrusions 56e which, when the head stand 47 is moved to the right, engage with the pin 30d of one of the supporting levers 30 thereby to prevent the engagement of the pin with the cut 47b of the head stand 47. The protrusions 56e are engaged with one of the pins 30d separately according to the forward movement and backward movement of the slide member 56. That is, the pair of idler gears 28 are disengaged from the reel units one at a time when the slide member 56, a part of the head rotating mechanism, reciprocates.

A cassette loading mechanism will be described.

As shown in FIGS. 2, 6, 12, 13 and 14, a subchassis B 95 is fixedly mounted on the right end portion of the upper surface of the chassis 3. A swinging member A 96, extending in the right-to-left direction, is arranged on the chassis 3 and is swingably coupled, at its rear end, to the sub-chassis B 95 and a supporting protrusion 3d provided at the left-rear end portion of the chassis 3. A cassette holder 98 adapted to hold a cassette is coupled to the free, front end of the swinging member 96 in such a manner that it is swingable about its central portion in the front-to-rear direction. The position of the cassette holder 98 shown in FIG. 6 will be referred to as the up position of the cassette holder. When the cassette holder is at the up position, the cassette is inserted thereinto the direction of the arrow S and held therein. The position of the cassette holder 98 when, under this condition, the swinging member 96 swings downwardly through a predetermined angle, whereby the cassette in the cassette holder 98 is set at the playback position, will be referred to as a down position of the cassette holder. That is, the cassette holder 98 is movable between the up position and the down position.

A moving member 101 formed of the upper surface member 99 and the right surface member 100 and engageable with the cassette is arranged under the cassette holder 98 in such a manner that the moving member 101 is movable backwards and forwards, i.e., in the directions of insertion and removal of the cassette. A pin 100a, provided on the right surface of the right surface member 100, is engaged with an elongated hole 95a which is formed in the sub-chassis B 95 extending in the front-to-rear direction. A lever F 102 is mounted on the lower portion of the middle part of the sub-chassis B 95 in such a manner that it is swingable about its lower end. The upper end of the lever F 102 is pivotally coupled to the pin 100a. The lever F 102 is coupled to a coil spring 103 which urges the lever F 102 clockwise in FIG. 13, thereby to apply a biasing force to the moving member 101 in the direction of removal of a cassette, i.e., forwardly. A cut 101b extending downwardly if formed in the front end portion of the right surface member 100. When a cassette is inserted, the right surface member 100 is moved backwardly. As a result, the swinging support shaft 98a of the cassette holder 98 drops into the cut 100b, and the cassette holder is moved to the aforementioned down position. A coil spring 104 is connected to the right end of the swinging member A 96 to urge the latter clockwise in FIG. 13. When the moving member 101 is moved in the direction of insertion of a cassette (rearwards), the cassette holder 98 is urged towards the down position by the coil spring 103.

Figure 12:
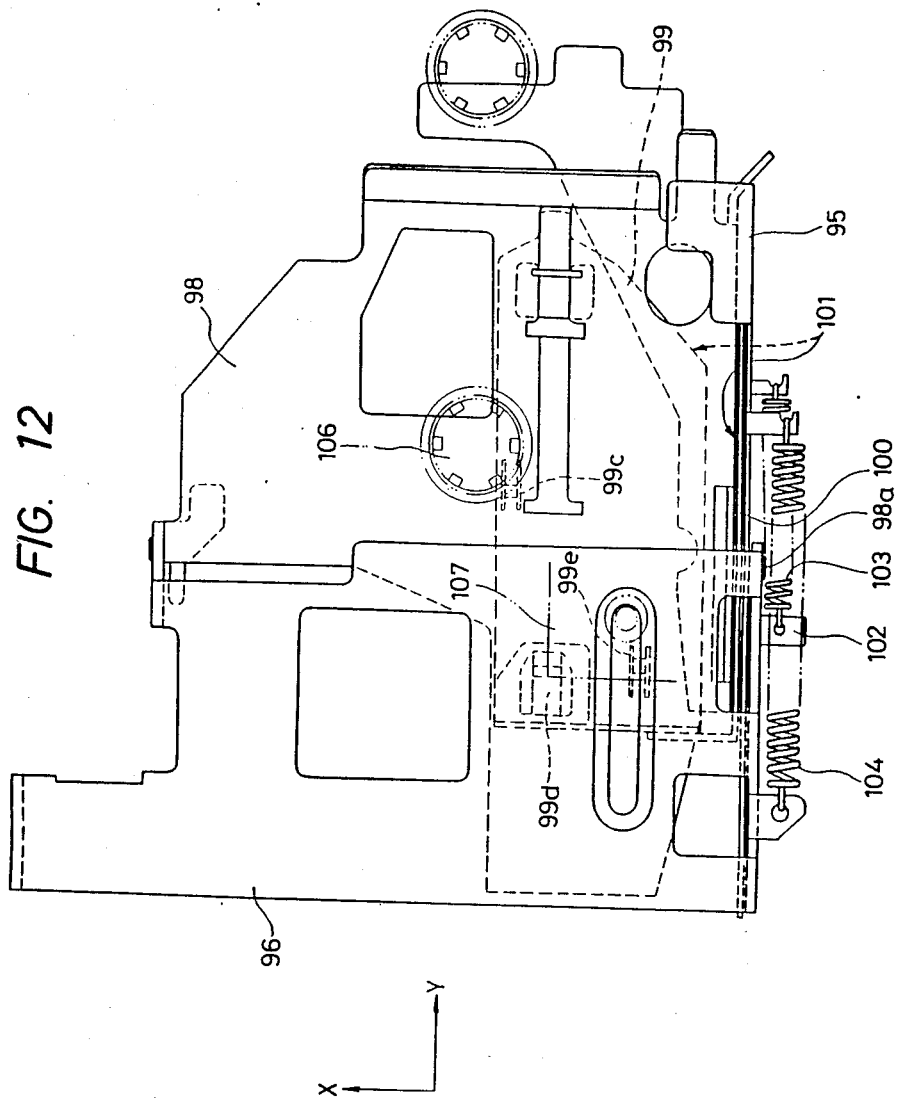
Figure 13:
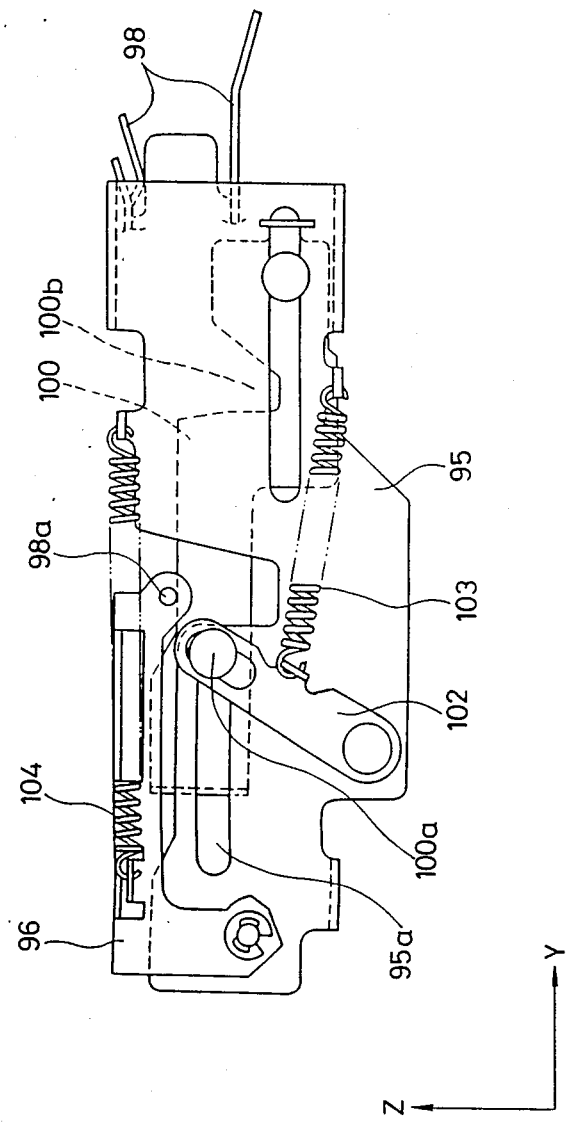
Figure 14:
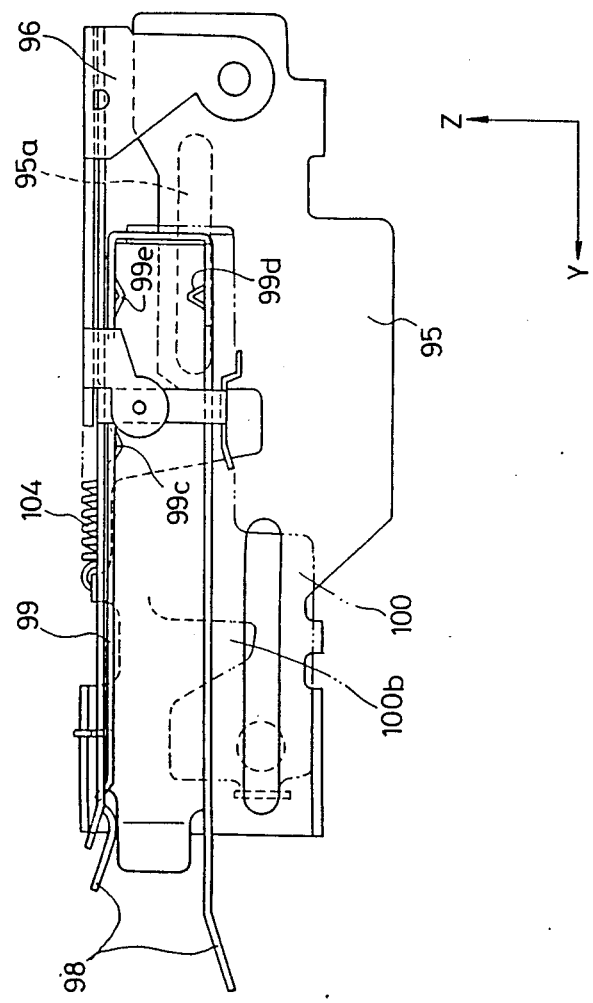

As is apparent from FIGS. 12 and 14, a protrusion confronting one of the reel holes 106 of an inserted cassette and a spring member 99d for urging the cassette to cause the protrusion 99c to protrude into the reel hole 106 are provided on the upper surface member 99 of the moving member 101. The protrusion 99c is formed integrally on the upper surface member 99, for instance, by embossing. As the protrusion 99c is integral with the upper surface member 99, it is unnecessary to mount a special part on the upper surface member 99 to provide the protrusion. Therefore, the number of components and the number of manufacturing steps are reduced, which further contributes to a reduction of the manufacturing cost.

Another protrusion 99e, which engages the cassette near the aforementioned reel hole 106, is formed on the upper surface member 99. Similarly, as in the case of the protrusion 99c, the protrusion 99e is formed integrally on the upper surface member 99, for instance, by embossing, which, for the same reason, contributes to a reduction of the manufacturing cost. The protrusion 99e is engaged with a recess 107, namely, a label-receiving area, formed in the cassette half. Accordingly, the protrusion 99e is positively engaged with the cassette.

In the cassette tape deck, a cassette is inserted into the cassette holder 98 in the longitudinal direction of the cassette. The above-described control mechanism for reciprocating the head stand 47 and rotating the magnetic head is arranged near the innermost portion of the cassette holder 98.

A mechanism for performing a fast forwarding (FF) operation and a rewinding (REW) operation will now be described.

Figure 15:
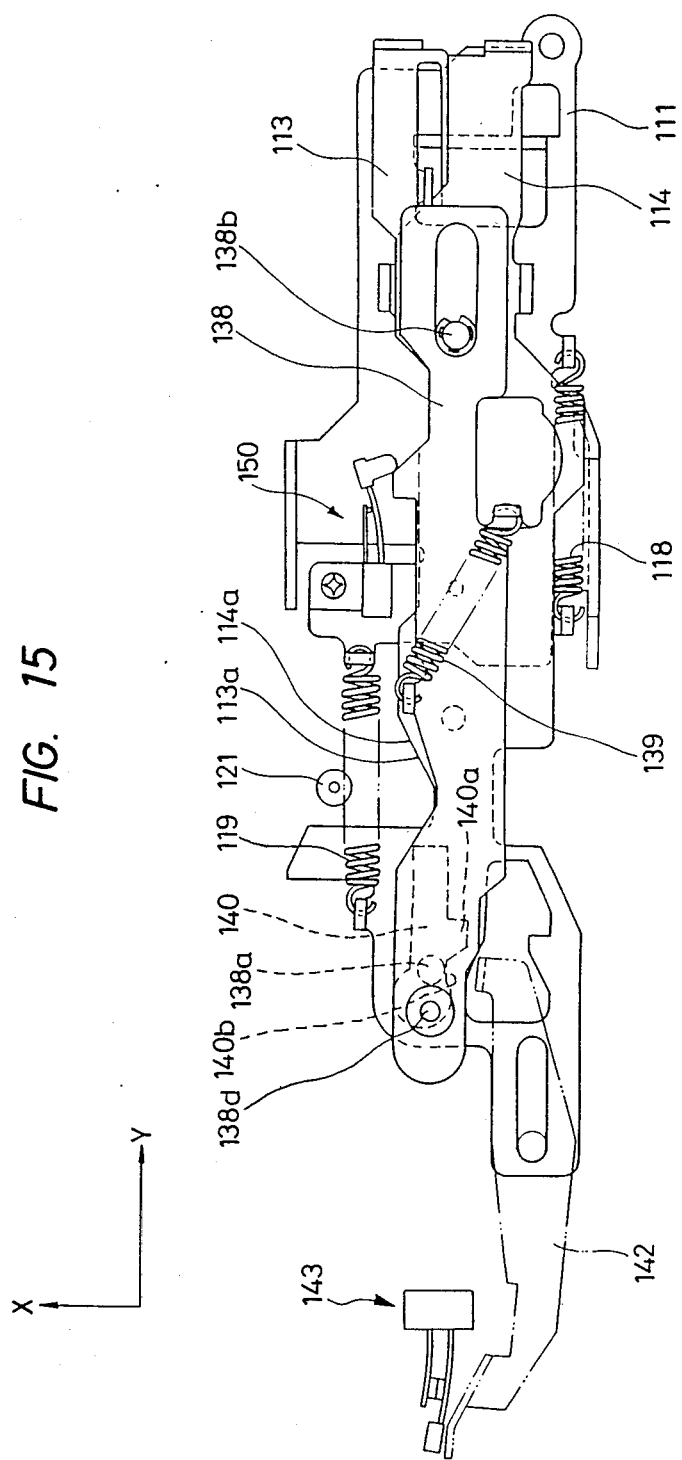

As shown in FIGS. 2, 3, 9 and 16, the left end portion of the chassis 3 is bent upwardly, and a sub-chassis C 111, shown in FIGS. 7 and 15, is also fixedly secured to the bent part 3f. A pair of long operating levers 113 and 114 which extend in the front-to-rear direction and are laid one on another are mounted on the sub-chassis C 111 in such a manner that they are movable backwards and forwards. The front end portions, namely, the operating end portions of the longitudinal operating levers, are spaced a certain distance from each other in the front-to-rear direction. Operating buttons 115 and 116 (FIG. 1) provided on the front wall of the housing 2 are secured to the front end portions of the operating levers. The lower operating lever 113 is caused to move rearwardly to perform the rewinding operation. These operating levers 113 and 114 are arranged above the magnetic head 49. The operating levers 113 and 114 are pulled frontwards by coil springs 118 and 119, respectively.

As shown best in FIGS. 5 and 7, the left parts of the rear end portions of the operating levers 113 and 114 are formed as tapered parts 113a and 114a, respectively, which, when the head stand is moved to the right, can engage with the upper end portion of a long pin 121 which protrudes from the left end portion of the upper surface of the head stand 47. That is, if one of the operating levers 113 and 114 is depressed while the head stand 47 is moved a predetermined distance to the left, the magnetic head is disengaged from the magnetic tape. When the head stand 47 is moved the predetermined distance to the left as described above, the protrusions 47a of the head stand 47 are engaged with the pins 30d of the supporting levers 30 holding the idler gears 28, whereby the idler gears 28 are disengaged from the double-gears 5f of the reel units 5. On the other hand, as shown in FIGS. 3 and 9, a pair of pawl members 123 for preventing the reverse rotation of the reel units 5 are provided on the chassis 3. When the head stand 47 is moved, the right end portion of the head stand 47 engages with the pawl members 123 to open the latter, thereby to eliminate the state of the reel units 5 in which the reverse rotation is prevented by the pawl members.

Figure 16:
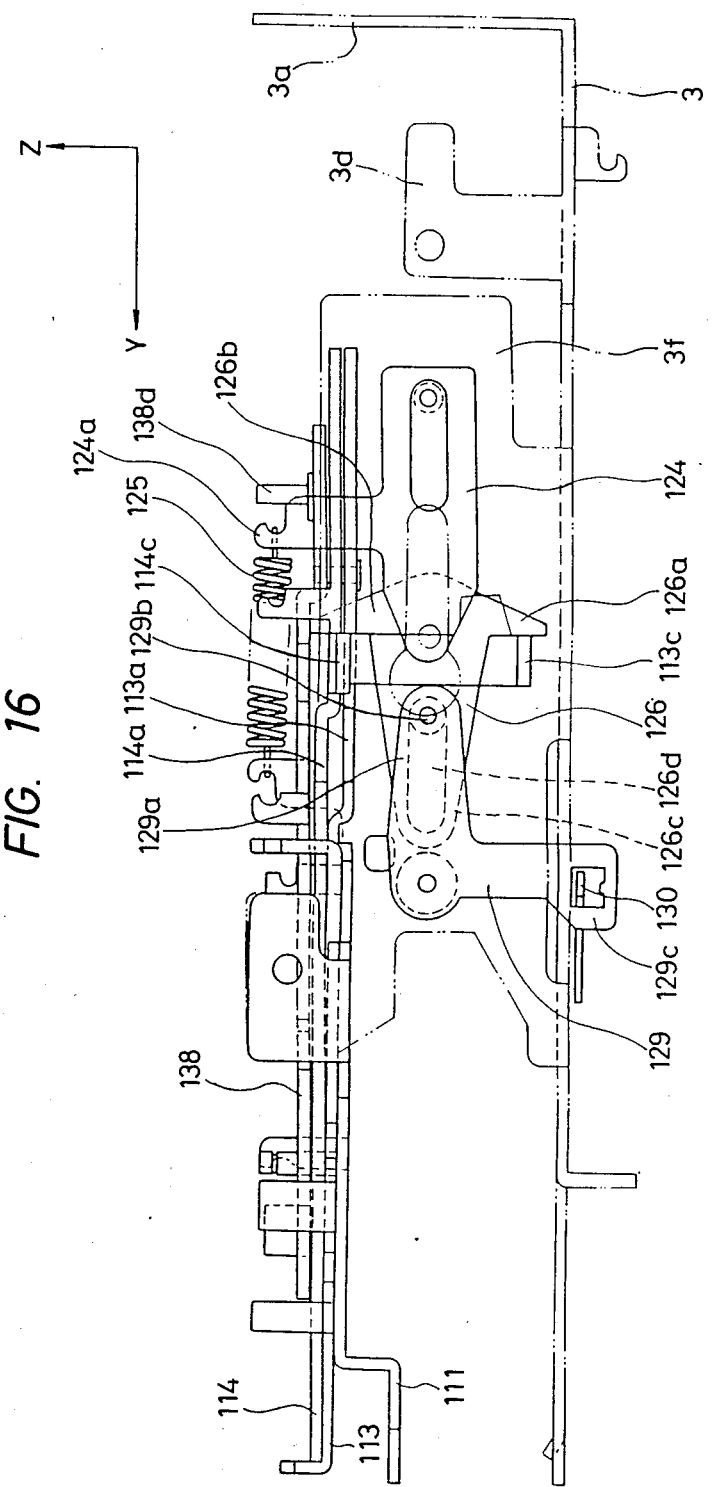

As shown in FIGS. 2, 3 and 16, a plate 124 is mounted on the rear end portion of the right surface of the bent part 3f, formed at the left end of the chassis 3, in such a manner that the plate 124 is movable rearwards and frontwards. A protrusion 124a extends from the upper edge of the plate body, and a coil spring 125 is connected to the protrusion 124a to urge the plate 124 frontwards. A T-shaped lever H 126 is mounted on the front end portion of the plate 124 in such a manner that it is rotatably about its central part. As is shown best in FIG. 16, the lever H 126 has a first end portion 126a extending downwardly, and the front edge of the first end portion 126a is abutted against the rear edge of the protrusion 113c, which extends downwardly from the long operating lever 113. The lever H 126 has a second end portion 126b extending upwardly, and the front edge of the second end portion 126b is abutted against the rear edge of the protrusion 114c, which extends substantially to the left from the long operating lever 114. That is, the lever H. 126 is turned counterclockwise and clockwise in FIG. 16 by pushing the long operating levers 113 and 114, respectively.

A substantially L-shaped lever I 129 arranged in front of the plate 124 is mounted on the bent part 3f of the chassis 3 in such a manner that the lever I is rotatable about its central bent part. The lever I 129 has a first end portion 129a extending rearwards. A pin 129b is provided on the end of the first end portion 129a. The lever H 126 has a third end portion 126c extending frontwards. The aforementioned pin 129b is slidably engaged with an elongated hole 126d formed in the third end portion 126c. The lever I 129 has a second end portion 129c extending downwardly.

As shown in FIGS. 2, 3, 10 and 16, a rocking lever 130 is arranged between the pair of reel units 5 and the pair of flywheels 27, extending in the right-to-left direction. The rocking lever 130 is rockably mounted, at its substantially central portion, on a pin 130a provided on the chassis 3. The left end of the rocking lever 130 is pivotally coupled to the end of the second end portion 129c of the lever I 129. A gear transmission mechanism composed of three gears 132, 133 and 134 engaged in series with one another is provided below the right end portion of the rocking lever 130. In the gear transmission mechanism, the first stage gear, namely, the gear 132 is engageable with the gears 27a of the pair of flywheels 27, and the last stage gear, namely, the gear 134, is engageable with the small diameter gears of the double-gears 5f of the reel units 5. That is, by pushing the long operating levers 113 and 114, the rocking lever 130 is rocked rearwards and frontwards, respectively, as a result of which the reel units 5 arranged in front of and at the rear of the rocking lever are selectively turned at high speed.

As shown in FIGS. 2, 7, 15 and 16, an intermediate lever 138, provided on the sub-chassis C 111 holding the operating levers 113 and 114 and extending parallel to the operating levers 113 and 114, is freely reciprocated in the direction of movement of the operating levers. A coil spring 139 is connected to the intermediate lever 138 to urge the latter frontwards. As is clear from FIG. 15, a pin 138a, which protrudes from the lower surface of the rear end portion of the intermediate lever 138, is slidably engaged with elongated holes 140 formed in the long operating levers 113 and 114 and extending in the front-to-rear direction. The elongated holes 140 have cuts 140a at the right edge of the central portion. The pin 138a can be inserted into the cuts 140a. The intermediate lever 138 can swing through a predetermined angle about a supporting shaft 138b provided on the front end portion of the intermediate lever 138.

A coil spring 139 adapted to urge the intermediate lever 138 frontwards is held inclined from above so that the intermediate lever 138 is urged counterclockwise about the supporting shaft 138b in FIG. 15. When the long operating levers 113 and 114 are moved rearwards simultaneously, the pin 138a of the intermediate lever 138 is engaged with the cuts 140a of the elongated holes 140 so that the intermediate lever 138 is moved rearwards. However, in the case only one of the long operating levers 113 and 114 is moved rearwards, the pin 138a is maintained abutted against the right edge of the rear half of the elongated hole 140 formed in the other long operating lever, and therefore the intermediate lever is not moved rearwards.

A mechanism is provided which, when one of the long operating levers 113 and 114 (for the fast forwarding operation and the rewinding operation) is moved rearwards, locks the operating lever at the "go" position. When the other operating lever is moved, the locking mechanism. locks the operating lever at the "go" position and unlocks the one operating lever. When one of the long operating levers 113 and 114 is depressed, a lever J 142, provided at the rear of the operating levers, is swung clockwise in FIG. 15 to operate a mute switch 143.

As is clear from FIGS. 2 and 7 for instance, a pin 138d is fixed to the upper surface of the rear end portion of the intermediate lever 138. The pin 138d can engage with the left end part 96a of the swinging member 96 (see FIG. 6, for instance). The intermediate lever 138 is used to depress the swinging member 96 when moved rearwards, thereby to move the cassette holder 98 to the up position.

Various switches, other than the above-described mute switch 143, and their arrangement will be described.

Figure 6:
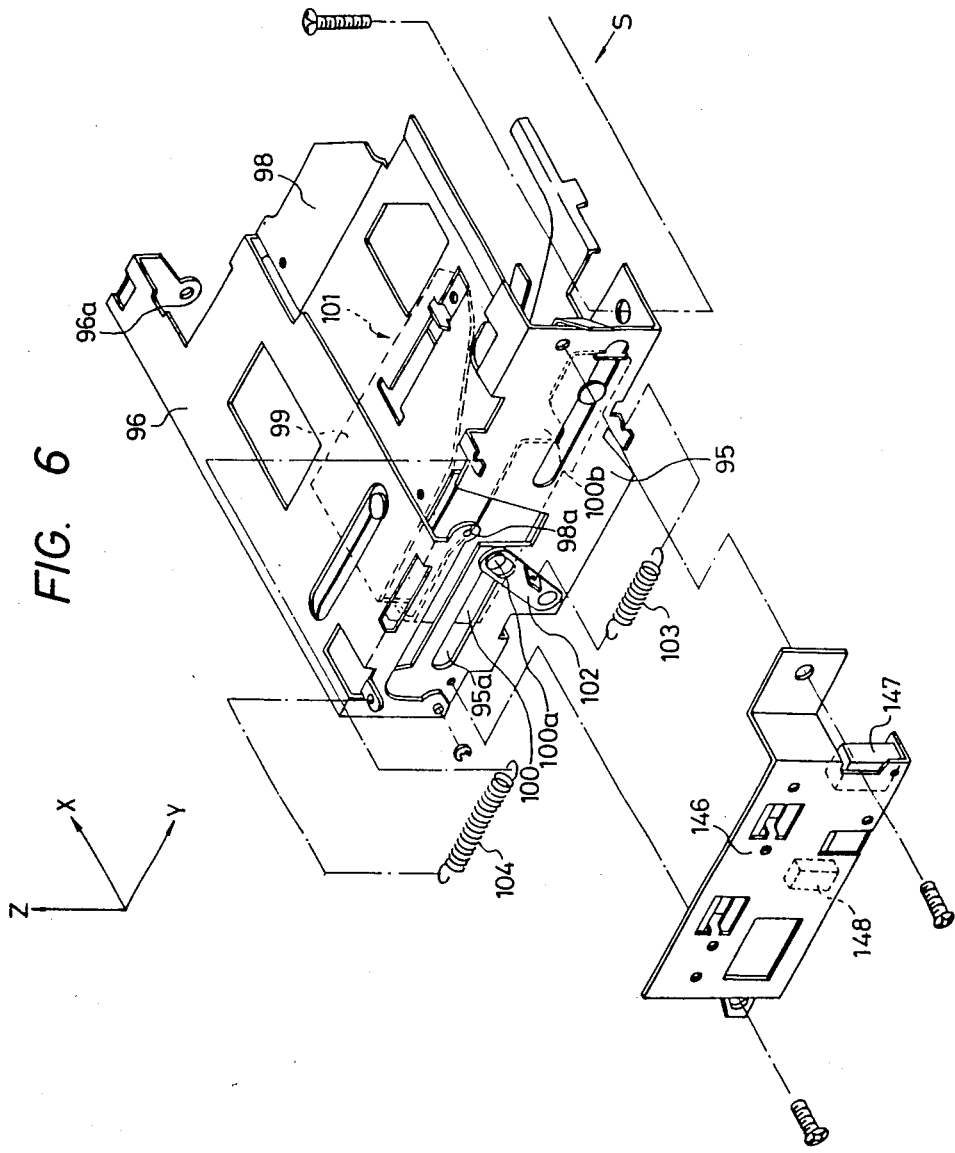

As is apparent from FIGS. 2 and 6, a bracket 146 is mounted on the right end face of the sub-chassis B 95, and two switches 147 and 148 are installed on the bracket 146. The switch 147 is used to control the application of electric power to the cassette deck and a tuner provided near the cassette deck. The switch 148 is used to operate the motor 24. The switches 147 and 148 are mechanically operated when a cassette half is inserted into the cassette holder As shown in FIGS. 2, 7 and 18, a switch 149 for switching a fast forward operation and a rewinding operation is fixedly secured to the front surface of the left end portion of the sub-chassis A 11. The switch 149 is operated when engaged with a moving plate 52 mounted on the sub-chassis A.

As shown in FIG. 15, a switch 150 for suspending the application of electric power to the cassette deck is provided on the sub-chassis 111 The switch 150 is operated when the intermediate lever 138 is moved in the "go" direction (is moved rearwards).

The operation of the cassette tape deck thus constructed will be briefly described according to its operating procedure referring to FIGS. 19 through 26.

Figure 19:
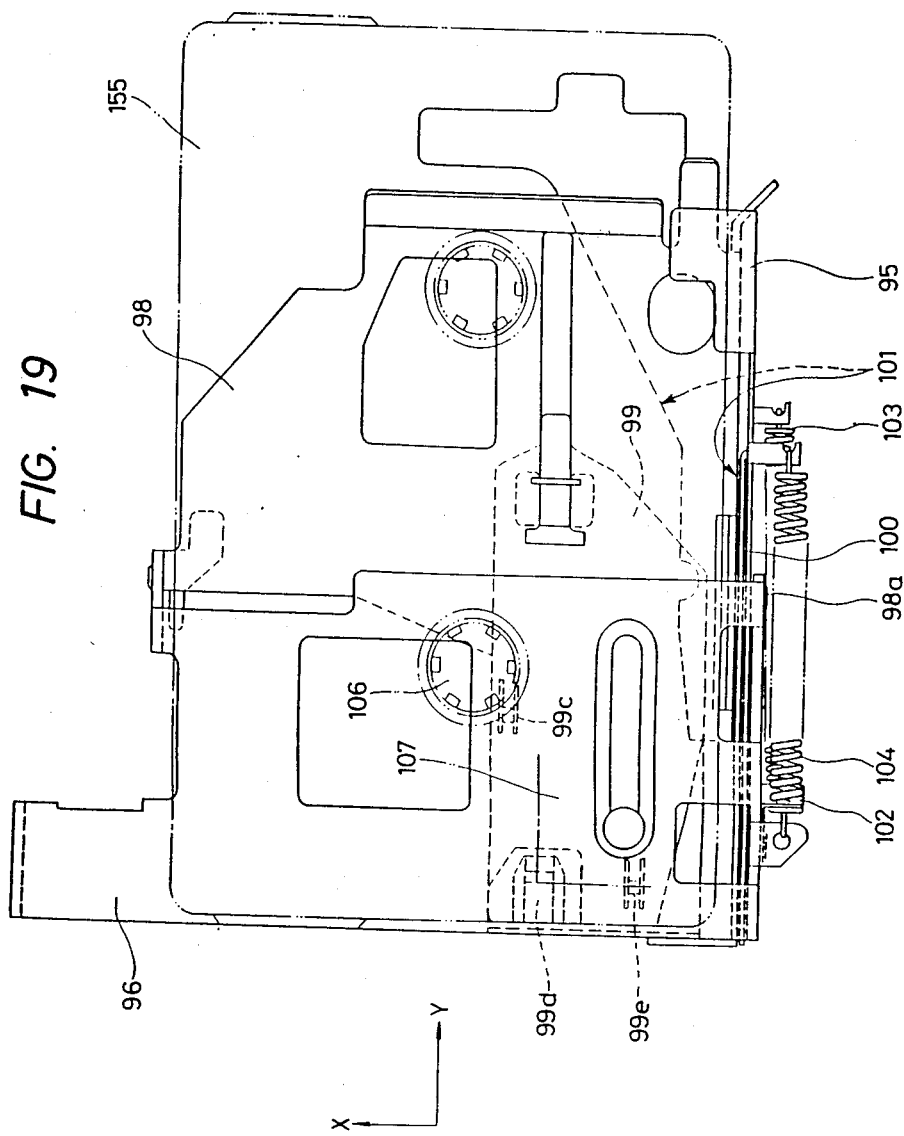
FIGS. 19 through 26 are diagrams used for a description of the operations of the cassette tape deck.
Figure 20:
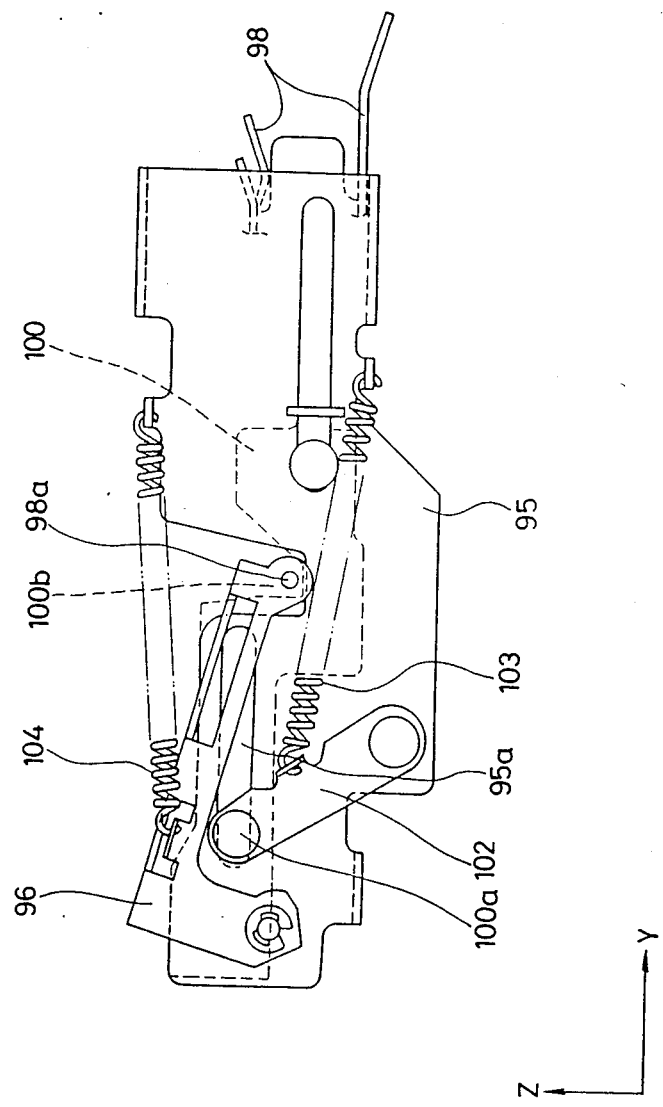
Figure 21:
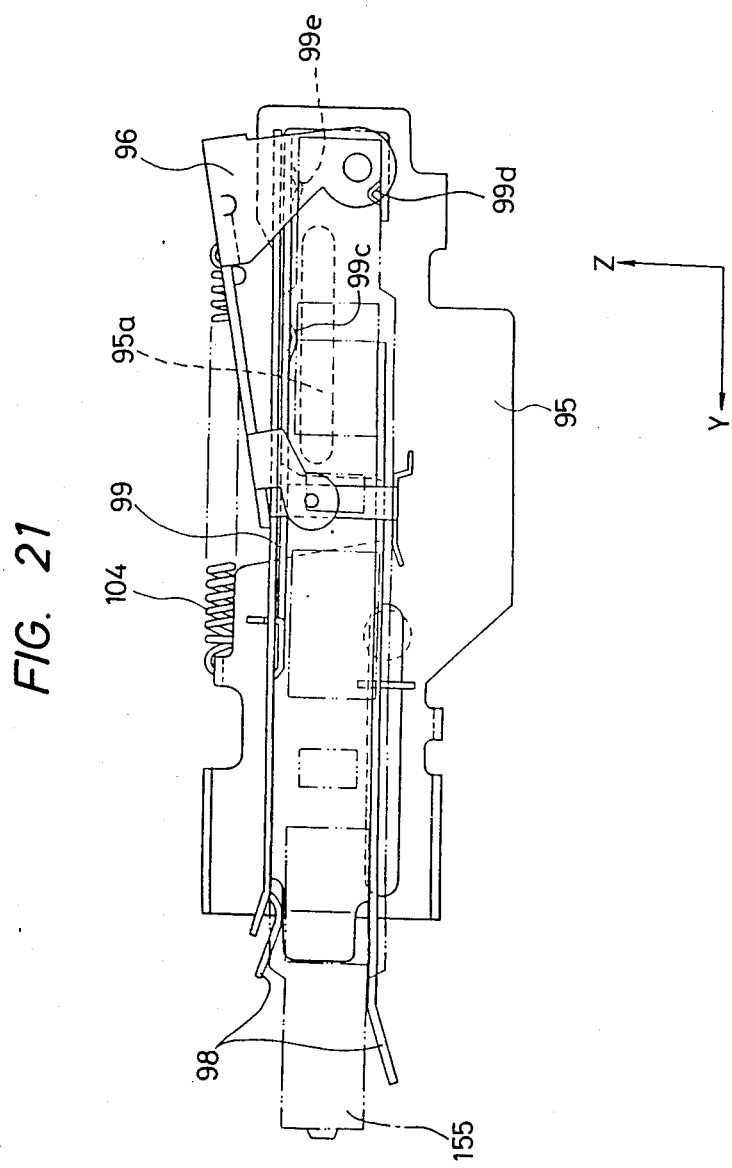

First, a cassette 155 (shown in FIG. 19) is inserted into the cassette deck through the opening 2a of the housing 2 shown in FIG. 1 so as to be held by the cassette holder 98 as shown in FIGS. 19 through 21. As the cassette 155 is inserted into the cassette holder, the right face member 100 is moved rearwards, as shown in FIG. 20, as a result of which the rocking support shaft 98a of the cassette holder 98 is dropped into the cut 100b in the right face member 100 and the cassette holder is moved to the down position.

As the cassette is inserted as described above, the switches 147 and 148 (shown in FIG. 6, for instance) are operated so that electric current is applied to the cassette deck, whereupon the motor 24 is rotated. As the motor 24 is rotated, as shown in FIG. 10, the small pulley 24a is turned in the direction of the arrow M, the pulley 23.is turned in the direction of the arrow N, and the pair of flywheels 27 are rotated, respectively, in the direction of the arrow O and in the direction of the arrow P. Accordingly, the pair of reel units 5 are rotated in the direction of the arrow Q and in the direction of the arrow R through the pair of idler gears 28 (FIG. 10). As the reel units 5 are turned in opposite directions, the magnetic tape in the cassette 155 is tightened if slackened. When a predetermined tension is applied to the magnetic tape in this manner, all the components of the reel unit 5 shown in FIG. 11, except for the double-gear 5f, are fixed by the reaction of the tension, as a result of which only the double-gear 5f is rotated through the felt plate 5h. Accordingly, the magnetic tape is maintained under tension and will not be run.

Figure 22:
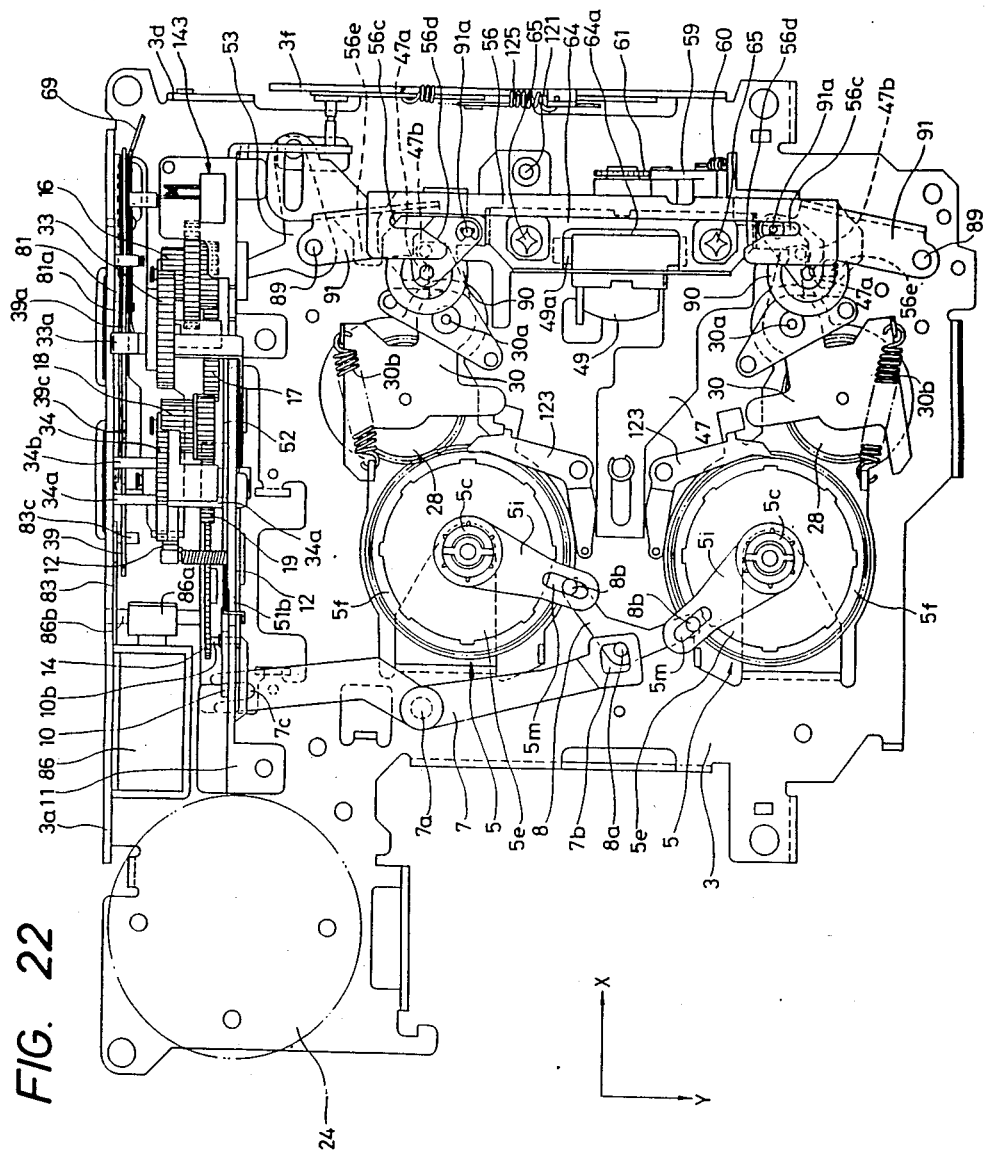
Figure 23:
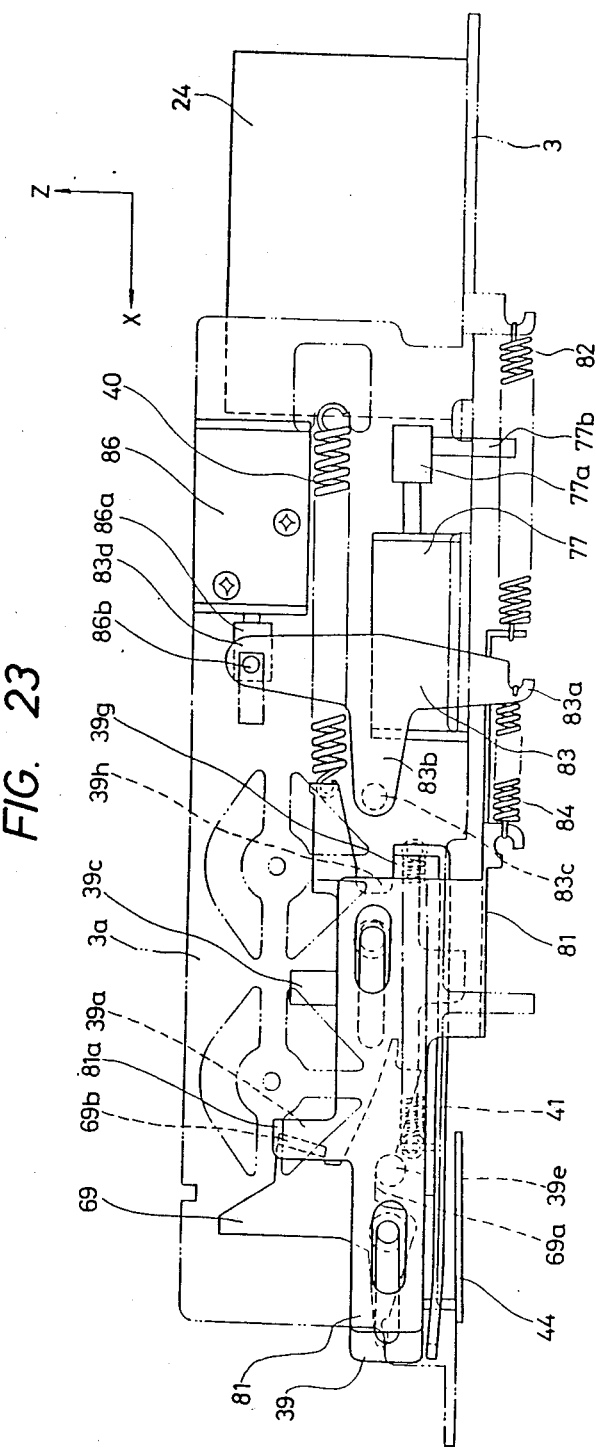

On the other hand, the end detecting gear shown, for instance, in FIGS. 7 and 18, is rotated counterclockwise in FIG. 18 through the gear transmission mechanism 20 by rotation of the motor 24. Therefore, as the end detecting gear 14 rotates, the pin 10b of the end detecting lever 10 is moved. to the top of one triangular protruding part 14b of the end detecting gear 14. As is apparent from the above description, the arm 5i of each reel unit 5 is then held stopped. Therefore, the intermediate lever 7 is not operated yet, and the pin 10b of the end detecting lever 10 does not slide along the triangular protruding part 14b. Therefore, the pin 10b of the end detecting lever 10 is held at rest at the top of the triangular protruding part 14b so that the pin 10b is engaged with the protrusion 14c of the end detecting gear 14. As a result, the end detecting lever 10 is moved upwardly so that the start trigger lever 73 is turned clockwise in FIG. 18 through the lever A 21, thus permitting the rotation of the first gear 33, which has been maintained stopped by the pin 33a engaged with the start trigger lever 73. That is, the first gear 33 is turned clockwise in FIG. 18 by the coil spring 35. As a result, the partial toothed part 33b of the first gear 33 is engaged with the gear 16 so that the first gear 33 starts rotating. As the first gear 33 rotates, the control plate 39 (shown in FIG. 17, for instance) is moved to the left. Therefore, the head stand 47 is moved to the right, as shown in FIG. 22, and the magnetic head 49 is abutted against the magnetic tape. When the control plate 39 reaches the maximum "go" position (left-movement limit position), its pin 39e is engaged with the engaging cut 69a of the inhibiting lever 69 so that the "return" movement of the control plate (movement to the right) is inhibited. As the first gear 33 is turned as described above, the moving member 81 (shown in FIG. 17) is also moved to the left, as shown in FIG. 23. Accordingly, the lever E 83 is turned clockwise, as shown in FIG. 23, and the movable rod 86a of the electromagnetic solenoid 86 which has been energized already is pushed in. As a result, the pin 83c of the lever E 83 is engaged with the cut 39h formed in the right end portion of the control plate 39, and therefore the control plate 39 can move to the maximum "return" position (right-movement limit position). Furthermore, the pin 39e of the control plate 39 passes into the engaging cut 69a of the inhibiting lever 69. Therefore, the inhibiting lever 69 is turned clockwise through the predetermined angle, as shown in FIG. 23, so that the upper end portion of the inhibiting lever turns off the mute switch 143, which has been turned on through the lever J 142 (see FIG. 7).

On the other hand, as shown in FIG. 22, as the head stand is moved to the right, the front idler gear is disengaged from the double-gear 5f of the front reel unit 5, and only the rear reel unit 5 is rotated. This operation is achieved by the interactions between the protrusions 47a and the cuts 47b of the head stand 47 and the protrusions 56e of the slide member 56; however, a further detailed description will not be given here because this operation is believed clear from the construction of the cassette tape deck. As shown in FIG. 22, as the head stand 47 is moved to the right, the rear pinch roller 90 is disengaged from the capstan 30a, because the pin 91a of the arm member 91 supporting the front pinch roller 90 is inserted into the cut 56c of the slide member 56. As shown in FIG. 22, when the head stand 47 is moved to the right, the pair of pawl members 123 are disengaged from the reel units 5.

Thus, the magnetic tape is run in the forward direction for playback.

Next, switching the tape running direction from the forward direction to the reverse direction will be described.

When the tape running direction changing switch is depressed, the electromagnetic solenoid 77 is energized so that its movable rod 77a is pulled. Therefore, the start trigger lever 73 is turned clockwise in FIG. 18 through the magnetic head switching instruction rod 75, thus permitting rotation of the first gear 33, which has been stopped by the trigger lever 73. That is, the first gear 33 is turned clockwise in FIG. 18 by the coil spring 35. As a result, the partial toothed part 33b of the first gear 33 is engaged with the gear 16 so that the first gear 33 starts rotating. Immediately after the first gear 33 starts rotating, the protrusion 33f of the first gear is engaged with the engaging protrusion 69b of the inhibiting lever 69 (see FIG. 17) so that the inhibiting lever is turned counterclockwise in FIG. 17. As a result, the engaging cut 69a of the inhibiting lever is disengaged from the pin 39e of the control plate 39 so that the latter is returned to the maximum "return" position (right-movement limit position) by the coil spring 40 instantaneously. As the control plate returns to that position, the head stand 47 is moved to the left, and the magnetic head 49 is disengaged from the magnetic tape.

When the control plate 39 is held at the maximum "go" position (left-movement limit position), the stop pin 34a is engaged with the regulating part 39d (see FIG. 4, for instance) of the control plate, thus preventing rotation of the second gear 34. However, the second gear 34 is released when the control plate returns to the maximum "return" position as described above. The second gear 34 is turned clockwise in FIG. 18 by the pawl member 51a and the spring 51b, for instance, as shown in FIG. 7. Therefore, the toothed part of the second gear 34 is engaged with the gear 18, thus starting rotation. As the second gear turns in this manner, the stop pin 34a of the second gear is engaged with the pawl 52a of the moving plate 52. As a result, the moving plate 52 is moved to the left and the magnetic head 49 coupled to the moving plate is turned through 180° for the tape reverse running operation. Furthermore, as the moving plate 52 is moved to the left, the switch 149 is operated for the tape reverse running operation.

As the second gear 34 is rotated as described, the stop pin 34a of the second gear is engaged with the protrusion 39c (see FIG. 17) of the control plate 39, as a result of which the control plate 39 is moved a predetermined distance to the left. When the second gear 34 turns through 180°, the stop 34a will be disengaged from the protrusion 39c of the control plate 39. In succession with this, the pin 33a of the first gear 33 is engaged with the protrusion 39a of the control plate 39 so that the control plate 39 is moved to the maximum "go" position (left-movement limit position) and locked by the inhibiting lever 69, as described above. As the control plate is moved to the maximum "go" position, the head stand 47 is moved to the right again, the magnetic head 49 is abutted against the magnetic tape, and the mute switch 143 is turned off.

The slide member 56 is moved frontwards by the left movement of the moving plate 52, whereby the head stand 47 is moved to the right, and the rear idler gear 28 is disengaged from the reel unit 5, while the front idler gear 28 is engaged with the reel unit, and hence only the front reel unit 5 starts rotating. Furthermore, the front pinch roller 90 is engaged with the capstan 30a, while the rear pinch roller 90 is disengaged from the capstan 30a.

Thus, the tape running direction has been switched from the forward direction over to the reverse direction.

The operation of switching the tape running direction from the reverse direction to the forward direction is substantially the same as the above-described operation of switching the tape running direction from the forward direction to the reverse direction, except that the stop pin 34b of the second gear 34 is engaged with the pawl 52b (FIG. 18) of the moving plate 52, thereby to move the latter to the right.

The operation of a mechanism for automatically switching the tape running direction will next be described.

Figure 11:
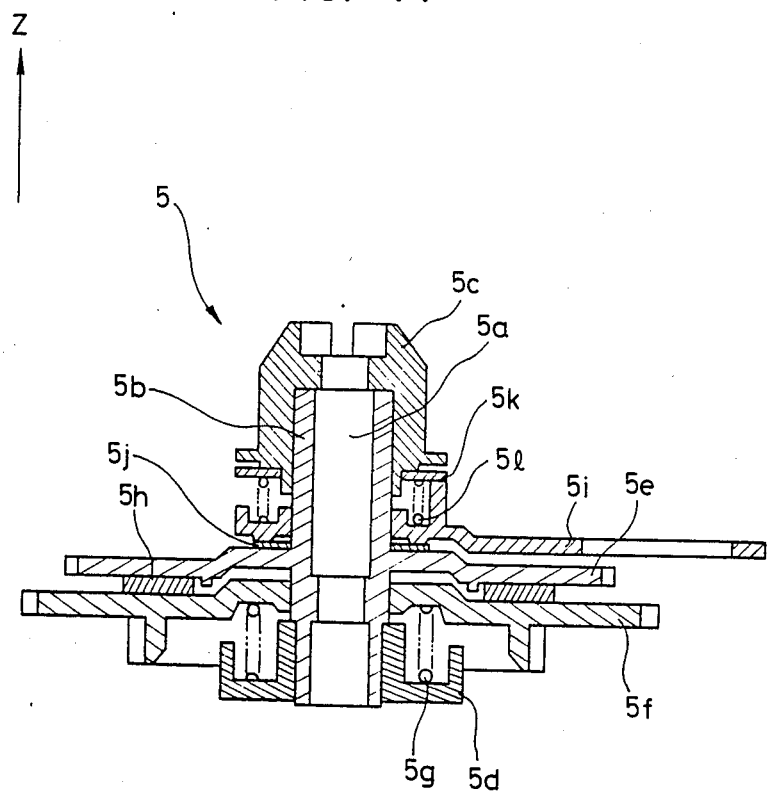
FIGS. 11 through 18 are diagrams showing the internal structures in more detail.

When the tape has been run in the forward direction for instance, a certain tension is applied to the end portion of the magnetic tape, and thus all the components of the reel unit 5 shown in FIG. 11, except for the double-gear 5f, are fixed by the reaction of the tension. Therefore, only the double-gear 5f idles with respect to the components thus fixed. While the tape is being run in the forward direction, the fixed components, except the arm member 5i, are rotated. The arm member 5i, being energized by torque, urges the intermediate lever 7 counterclockwise in FIG. 22 through the swinging lever 8. Therefore, the end detecting lever 10, to which the rear end of the intermediate lever is pivotally coupled, is turned counterclockwise in FIG. 18. Therefore, the pin 10b of the end detecting lever 10 is slid while in abutment against the triangular protrusion 14b of the end detecting gear 14, and the pin 10b does not engage with the protrusion 14c of the end detecting gear 14c. However, when the components of the reel unit 5, except for the double-gear 5f, are fixed upon stopping of the tape, the force of urging the end detecting lever 10 is eliminated, and thus the protrusion 14c of the end detecting gear 14 is engaged with the pin 10b of the end detecting lever 10. As a result, the end detecting lever 10 is moved upwardly, and the start trigger lever 73 is turned clockwise in FIG. 18 through the lever A 12. The remaining steps are completely the same as those in the operation of switching the tape running direction from the forwarding direction over to the reverse direction. In addition, the operation of automatically switching the tape running direction from the reverse direction over to the forward direction is similar to the above-described operations.

The fast forwarding operation and the rewinding operation of the cassette tape deck will be described.

Figure 24:
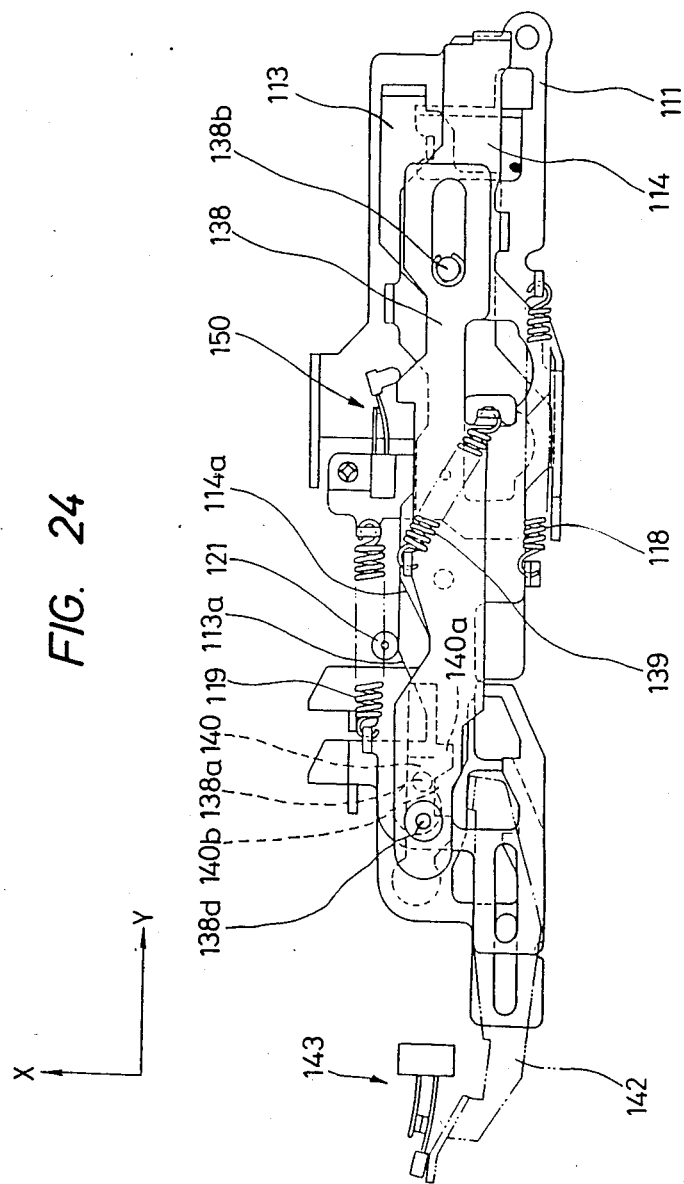
Figure 25:
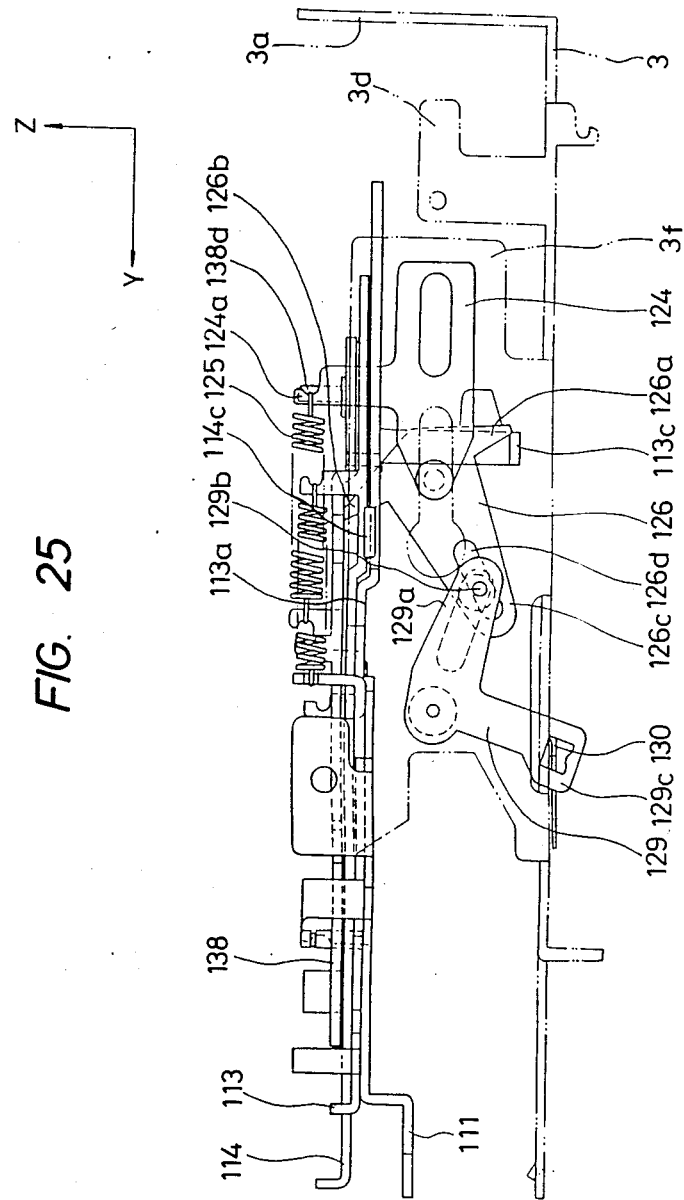

In order to perform the fast forwarding operation during playback of the magnetic tape, as shown in FIGS. 24 and 25 the long operating lever 113 for fast forwarding operation is pushed back, as a result of which the mute switch 143 is turned on with the aid of the lever J 142. On the other hand, the long pin 121 protruding from the left end portion of the head stand 47 is pushed to the left by the tapered portion 113a of the long operating lever 113 As a result, the head stand 47 is moved the predetermined distance to the left, and the degree of abutment of the magnetic head 49 against the magnetic tape is slightly reduced.

Figure 26:
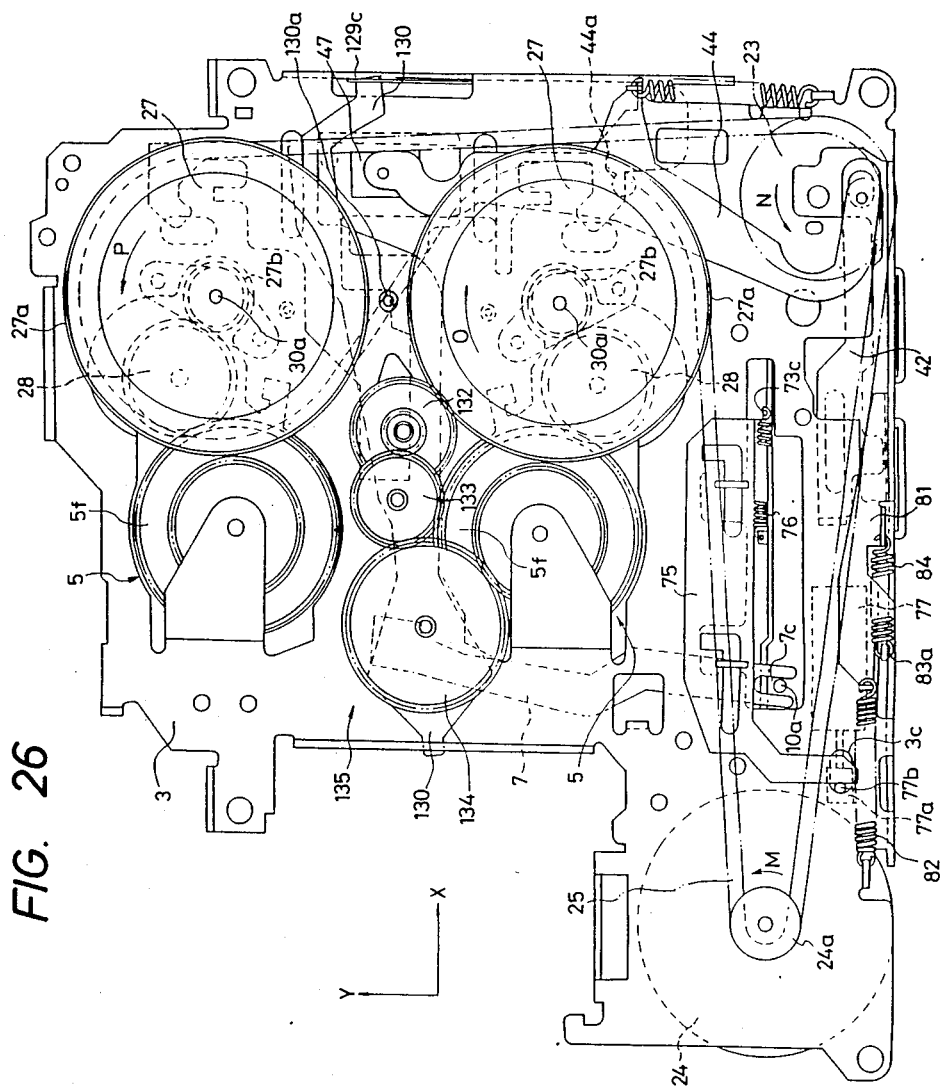

As is apparent from FIG. 25, when the long operating lever 113 is moved rearwards, the lever H 126 engaging the protrusion 113c of the lever 113 is swung counterclockwise in FIG. 25. Therefore, the lever I 129 is swung clockwise in FIG. 25, whereby, as shown in FIG. 26, the rocking lever 130 is turned counterclockwise (in FIG. 26) about the pin 130a. Therefore, in the gear transmission mechanism 135 provided above the rocking lever, the first gear 132 is engaged with the gear 27a of the rear flywheel 27, while the last gear 134 is engaged with the small-diameter gear of the double gear 5f of the rear reel unit 5. On the other hand, as the head stand 47 is moved to the left by pushing the long operating lever 113, the pair of idler gears 28 are disengaged from the reel units 5. Therefore, the rear reel unit 5 is rotated at high speed; that is, the tape fast-forwarding operation is carried out.

The rewinding operation is started by pushing the long operation lever 114. That is, the protrusion 114c of the long operating lever 114 is engaged with the second end portion 126b of the lever H 126 so that the lever H is turned clockwise in FIG. 25, and the first gear 132 and the last gear 134 are engaged with the front flywheel 27 and the front reel unit, respectively. The left-movement of the head stand 47 is carried out by engagement of the tapered portion 114a of the long operating lever 114 with the long pin 121 of the head stand 47.

After playback, the cassette can be rejected by pushing both of the long operating levers 113 and 114 simultaneously. By pushing the long operating levers 113 and 114 at the same time, the intermediate lever 138 (shown in FIG. 24, for instance) is moved rearwards, so that the pin 138d protruding from the rear end portion of the upper surface of the intermediate lever 138 is engaged with the left end portion of the rocking member 96 (shown in FIG. 6, for instance). That is, an operation which is completely reverse to that for loading the cassette 155 is carried out, whereupon the cassette 155 is delivered to the position where the operator can receive it. In addition, the switch 150 (shown in FIG. 24, for instance) is also operated so that the electromagnetic solenoid 86 (see FIG. 23) is deenergized, and the lever E 83 is restored as shown in FIG. 17 by the coil spring 82. As a result, the pin 83c of the lever E 83 becomes engageable with the protrusion 39g formed at the right end of the control plate 39. Thus, the return of the control plate 39 to the maximum "return" position (right-movement limit position) is inhibited. That is, the stop pin 34a of the second gear 34 is held engaged with the regulating part 39d of the control plate. Therefore, when the power switch is turned on again, the second gear 34 is not rotated, thus preventing the difficulty of the tape-running-direction switching operation being carried out uselessly.

In addition, as described above, the electromagnetic solenoid 86 is deenergized also when the key switch of the automobile is turned off.

As described herein in detail, the cassette tape deck according to the invention comprises: the head stand driving mechanism including the first gear for reciprocating the head stand which can be freely movable substantially at right angles to the tape running direction, and the head rotating mechanism including the second gear for turning the magnetic head, which is freely rotatable about an axis substantially parallel to the direction of movement of the head stand, torque being applied to the first and second gears by the torque applying unit including the single drive source. Accordingly, when compared with the conventional cassette tape deck in which at least two drive sources are used to perform the reciprocating operation for moving the magnetic head into and out of engagement with the magnetic tape, and the magnetic head rotating operation for rotating the magnetic head according to whether the magnetic tape is run in the forward direction or in the reverse direction, the cassette tape deck of the invention is small both in size and in manufacturing cost.

Moreover, in the cassette tape deck of the invention, the torque applying means includes the gear transmission mechanism, which is engageable with the first and second gears, and the trigger means, which causes the second gear to engage with the gear transmission mechanism after the first gear is engaged with the gear transmission mechanism. Therefore, after the head stand has moved to completely disengage the magnetic head from the magnetic tape, the magnetic head is turned. Therefore, the magnetic tape is protected from damage, and no noise is generated.

Still further, in the cassette tape deck of the invention, the head stand is caused to make one reciprocation by turning the first gear through 360°, and the magnetic head is turned through 180° by turning the second gear through 180°. Therefore, the reciprocation and the rotation of the magnetic head are effected with positive, optimum mutual timing.

Also, in the cassette tape deck of the invention, the speed ratio of the first and second gears is 1:1. Therefore, the timing of reciprocation of the magnetic head and the timing of rotation of the magnetic head can be set considerably easily.

We claim:

1. An automatic reversing cassette tape deck, comprising:
    a head stand (47) reciprocably mounted to move in a direction substantially perpendicular to a tape running direction;
    a magnetic head (49) mounted on said head stand and including magnetic head rotating means to rotate the head between two angular positions and about an axis substantially parallel to a direction of movement of said head stand;
    tape-running-direction switching means (30a, 90, 5, 28) for selecting a tape running direction separately according to said two angular positions of said magnetic head;
    a head stand driving mechanism including a first gear (33) rotated to reciprocate said head stand;
    a head rotating mechanism including a second gear (34) rotated to rotate said magnetic head;
    torque applying means (20, 22, 23, 25) for applying torque to first and second gears, and a single drive source (24) for supplying torque to said torque applying means.

2. An automatic reversing cassette tape deck as recited in claim 1, wherein the magnetic head rotating means comprise;
    a magnetic head rotating shaft having a longitudinal axis perpendicular to the tape running direction;
    a gear (61) coaxially secured on the rotating shaft;
    a bearing member (57) secured to the head stand and supporting the magnetic head; and
    a sector gear (59) coupled to the bearing member and rotatably engaged to said gear (60), wherein
    the sector gear is reciprocated by reciprocating means (52, 53, 56) to rotate the gear and rotating shaft of the magnetic head between said two angular positions.

3. An automatic reversing cassette tape deck, comprising:
    a head stand (47) reciprocably mounted to move in a dirction substantially perpendicular to a tape running direction;
    a magnetic head (49) mounted on said head stand and including magnetic head rotating means to rotate the head between two angular positions and about an axis substantially parallel to a direction of movement of said head stand;
    tape-running-direction switching means (30a 90, 5, 28) for selecting a tape running direction according to said two angular positions of said magnetic head;
    a head stand driving mechanism including a first gear (33) rotated to reciprocate said head stand;
    a head rotating mechanism including a second gear (34) rotated to rotate said magnetic head;
    a single drive source (24);
    torque applying means (22, 23, 25), including a gear transmission mechanism (20) engagable with said first and second gears, for applying torque from said single drive source to said first and second gears; and
    trigger means (69, 39, 40, 35, 51, 51a) for causing, after said first gear is engaged with said gear transmission mechanism, said second gear to engage with said gear transmission mechanism.

4. An automatic reversing cassette tape deck as recited in claim 3, wherein the magentic head rotating means comprise;
    a magnetic head rotating shaft having a longitudinal axis perpendicular to the tape running direction;
    a gear (61) coaxially secured on the rotating shaft;
    a bearing member (57) secured to the head stand and supporting the magnetic head; and
    a sector gear (59) coupled to the bearing member and rotatably engaged to said gear (60), wherein
    the sector gear is reciprocated by reciprocating means (52, 53, 56) to rotate the gear and rotating shaft of the magnetic head between said two angular positions.

5. A cassette tape deck comprising:
    a head stand reciprocably mounted to move in a direction substantially perpendicular to a tape running direction;
    a magnetic head mounted on said head stand in such a manner that said magnetic head is rotatable between two angular positions and about an axis substantially parallel to a direction of movement of said head stand;
    tape-running-direction switching means for selecting a tape running direction according to said two angular positions of said magnetic head;
    a head stand driving mechanism including a first gear rotated to reciprocate said head stand;
    a head rotating mechanism including a second gear rotated to rotate said magnetic head;
    a torque applying means, including a gear transmission mechanism engageable with said first and second gears, for applying torque from a single drive source to said first and second gears; and
    trigger means for causing, after said first gear is engaged with said gear transmission mechanism, said second gear to engage with said gear transmission mechanism,
    said trigger means comprising:
    a control plate reciprocable between a maximum "go" position and a maximum "return" position, said control plate being moved forwards by rotation of said first gear, said control plate having a regulating part which, when said control plate is out of said maximum "return" position, engages with said second gear to prevent rotation of said second gear;
    means for urging said control plate in a backward movement direction thereof;
    means for inhibiting backward movement of said control plate when said control plate reaches said maximum "go" position and releasing the inhibition in response to an initial turn of said first gear; and means for urging said first and second gears to engage with said gear transmission mechanism, said head stand being caused to make a reciprocation by turning said first gear through 360°, and said magnetic head being rotated through 180° by turning said second gear through 180°.

6. A cassette tape deck comprising:

a head stand reciprocably mounted to move in a direction substantially perpendicular to a tape running direction;

a magnetic head mounted on said head stand in such a manner that said magnetic head is rotatable between two angular positions and about an axis substantially parallel to a direction of movement of said head stand;

tape-running-direction switching means for selecting a tape running direction according to said two angular positions of said magnetic head;

a head stand driving mechanism including a first gear rotated to reciprocate said head stand;

a head rotating mechanism including a second gear rotated to rotate said magnetic head;

torque applying means, including a gear transmission mechanism engageable with said first and second gears, for applying torque from a single drive source to said first and second gears; and trigger means for causing, after said first gear is engaged with said gear transmission mechanism, said second gear to engage with said gear transmission mechanism, said trigger means comprising:

a control plate reciprocable between a maximum "go" position and a maximum "return" position, and moved forwards by rotation of said first gear, said control plate having a regulating part which, when said control plate is out of said maximum "return" position, engages with said second gear to prevent rotation of said second gear;

means for urging said control plate in a backward movement direction thereof;

means for inhibiting backward movement of said control plate when said control plate reaches said maximum "go" position and releasing the inhibition in response to an initial turn of said first gears; and means for urging said first and second gears to engage with said gear transmission mechanism, said head stand being caused to make one reciprocation by turning said first gear through 360°, and said magnetic head being rotated through 180° by turning said second gear through 180°, a speed ratio of said first and second gears being 1:1.

* * * * *